(12) United States Patent
Yamato

(10) Patent No.: US 9,109,891 B2
(45) Date of Patent: Aug. 18, 2015

(54) STEREO CAMERA

(75) Inventor: Hiroshi Yamato, Amagasaki (JP)

(73) Assignee: KONICA MINOLTA HOLDINGS, INC., Tokyo (JP)

( * ) Notice: Subject to any disclaimer, the term of this patent is extended or adjusted under 35 U.S.C. 154(b) by 410 days.

(21) Appl. No.: 13/574,952

(22) PCT Filed: Jan. 12, 2011

(86) PCT No.: PCT/JP2011/050319
§ 371 (c)(1),
(2), (4) Date: Jul. 24, 2012

(87) PCT Pub. No.: WO2011/096251
PCT Pub. Date: Aug. 11, 2011

(65) Prior Publication Data
US 2012/0293633 A1   Nov. 22, 2012

(30) Foreign Application Priority Data
Feb. 2, 2010   (JP) ................................. 2010-021152

(51) Int. Cl.
*H04N 13/02* (2006.01)
*G01C 11/06* (2006.01)
(Continued)

(52) U.S. Cl.
CPC ............... *G01C 11/06* (2013.01); *G03B 35/08* (2013.01); *G03B 35/10* (2013.01); *G06K 9/00208* (2013.01); *G06K 9/209* (2013.01); *G06T 7/0075* (2013.01); *H04N 13/0022* (2013.01); *H04N 13/025* (2013.01); *H04N 13/0239* (2013.01);
(Continued)

(58) Field of Classification Search
CPC .......... H04N 13/0239; H04N 13/0295; H04N 13/0055; H04N 2013/0081; G06T 7/0022; G06T 7/0024; G06T 7/0026; G06T 7/0028; G06T 7/003; G06T 7/0032
USPC ....................................... 348/46–50
See application file for complete search history.

(56) References Cited

U.S. PATENT DOCUMENTS

| 6,847,392 B1* | 1/2005 | House ............................. 348/36 |
| 6,915,008 B2* | 7/2005 | Barman et al. ................ 382/154 |

(Continued)

FOREIGN PATENT DOCUMENTS

| EP | 1 418 766 A2 | 5/2004 |
| JP | 10-134187 A | 5/1998 |

(Continued)

OTHER PUBLICATIONS

Communication and Extended European Search Report in International Application No. PCT/JP2011/050319, dated Sep. 13, 2013, 18 pages.

(Continued)

*Primary Examiner* — Michael Lee
(74) *Attorney, Agent, or Firm* — Brinks Gilson & Lione

(57) ABSTRACT

The present invention relates to a stereo camera which includes: a main camera which photographs a first image; a sub-camera which has camera parameters different from those of the main camera and photographs a second image; a distance information acquiring part which associates each pixel in the first and second images and acquires distance information including parallax information; and a right/left image generating part which generates a stereo view image based on one of the first and second images and the distance information.

5 Claims, 32 Drawing Sheets

(51) Int. Cl.
  *G03B 35/08* (2006.01)
  *G03B 35/10* (2006.01)
  *H04N 13/00* (2006.01)
  *G06K 9/00* (2006.01)
  *G06K 9/20* (2006.01)
  *G06T 7/00* (2006.01)

(52) U.S. Cl.
  CPC .. *H04N 2013/0081* (2013.01); *H04N 2213/005* (2013.01)

(56) References Cited

U.S. PATENT DOCUMENTS

2001/0052935 A1    12/2001    Yano
2002/0041704 A1*   4/2002     Yamamoto .................... 382/154

FOREIGN PATENT DOCUMENTS

| JP | H10-134187 A | 5/1998 |
|---|---|---|
| JP | 2000-102040 A | 4/2000 |
| JP | 2001-346226 A | 12/2001 |
| JP | 2004-297540 | 10/2004 |
| JP | 2005-210217 A | 8/2005 |
| JP | 2006-93859 A | 4/2006 |
| JP | 2006-093859 A | 4/2006 |
| JP | 2008-042227 A | 2/2008 |
| JP | 2008-92007 A | 4/2008 |
| JP | 2009-124308 | 6/2009 |
| WO | WO 2008/002271 A1 | 1/2008 |

OTHER PUBLICATIONS

Office Action/Notification of Reasons for Refusal in International Application No. PCT/JP2011/552721, dated Jul. 9, 2013, and English language translation, 7 pages.

International Search Report in International Application No. PCT/JP2011/050319, mailed Apr. 19, 2011, 1 page.

* cited by examiner

F I G . 4
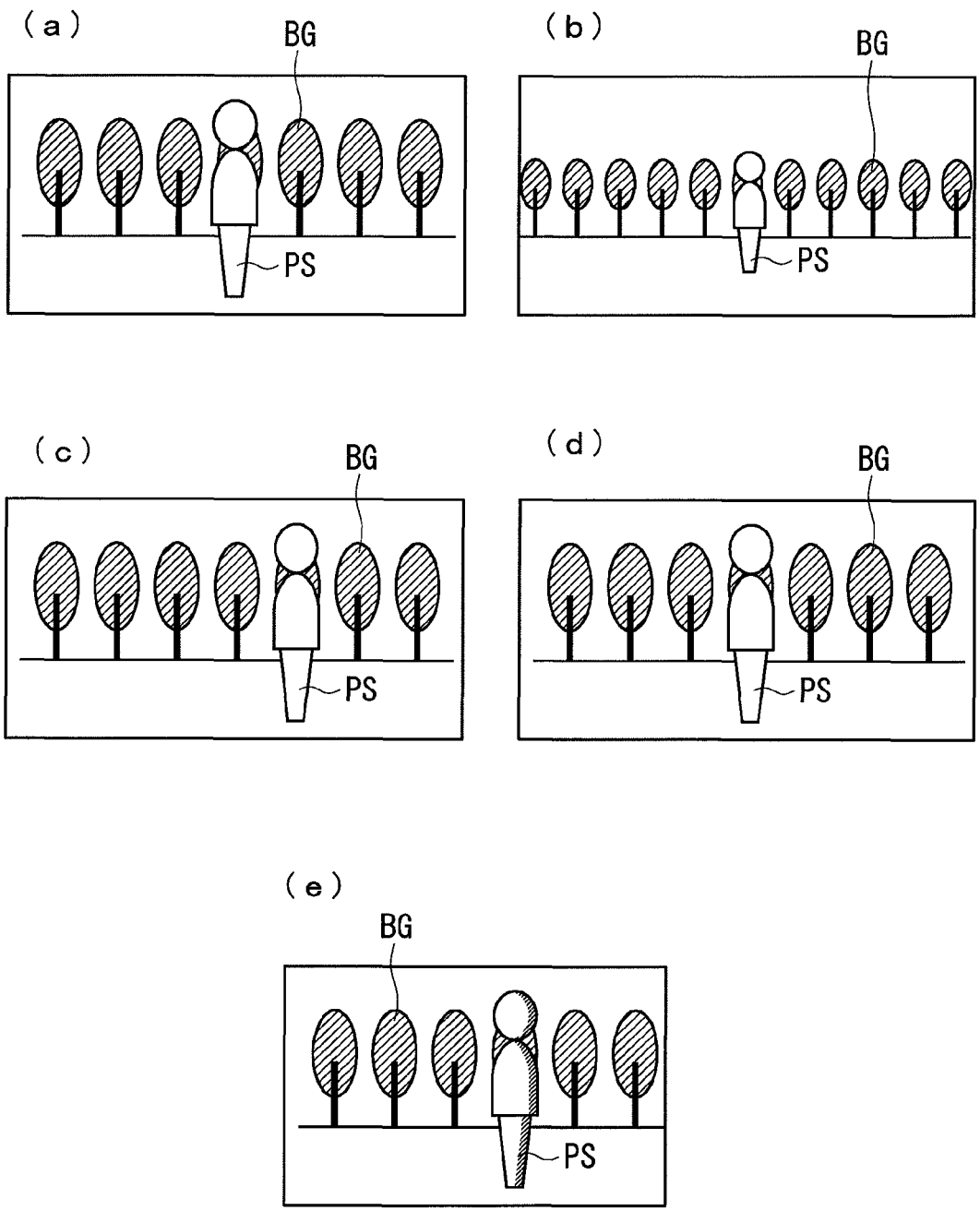

FIG. 6
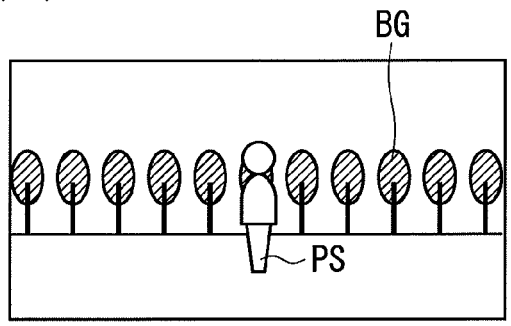
(a)
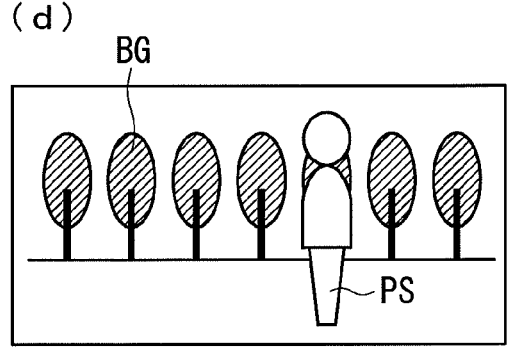
(d)
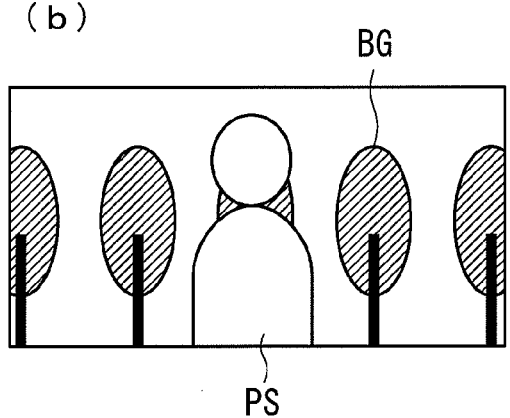
(b)
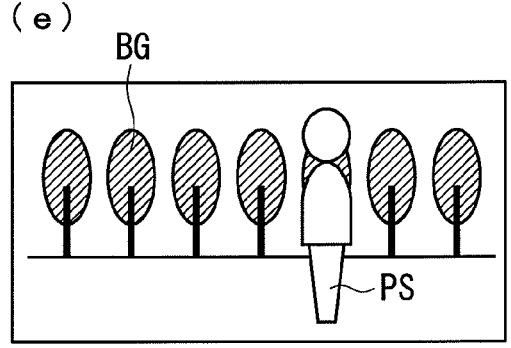
(e)
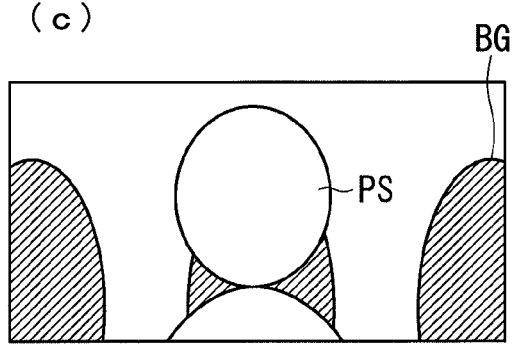
(c)
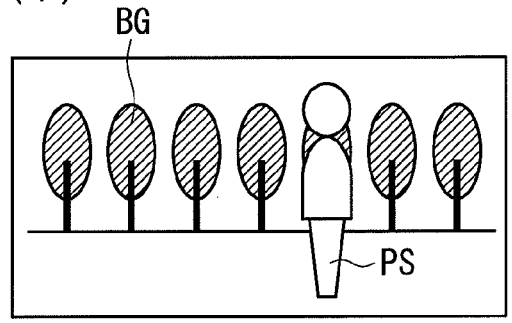
(f)

F I G. 9
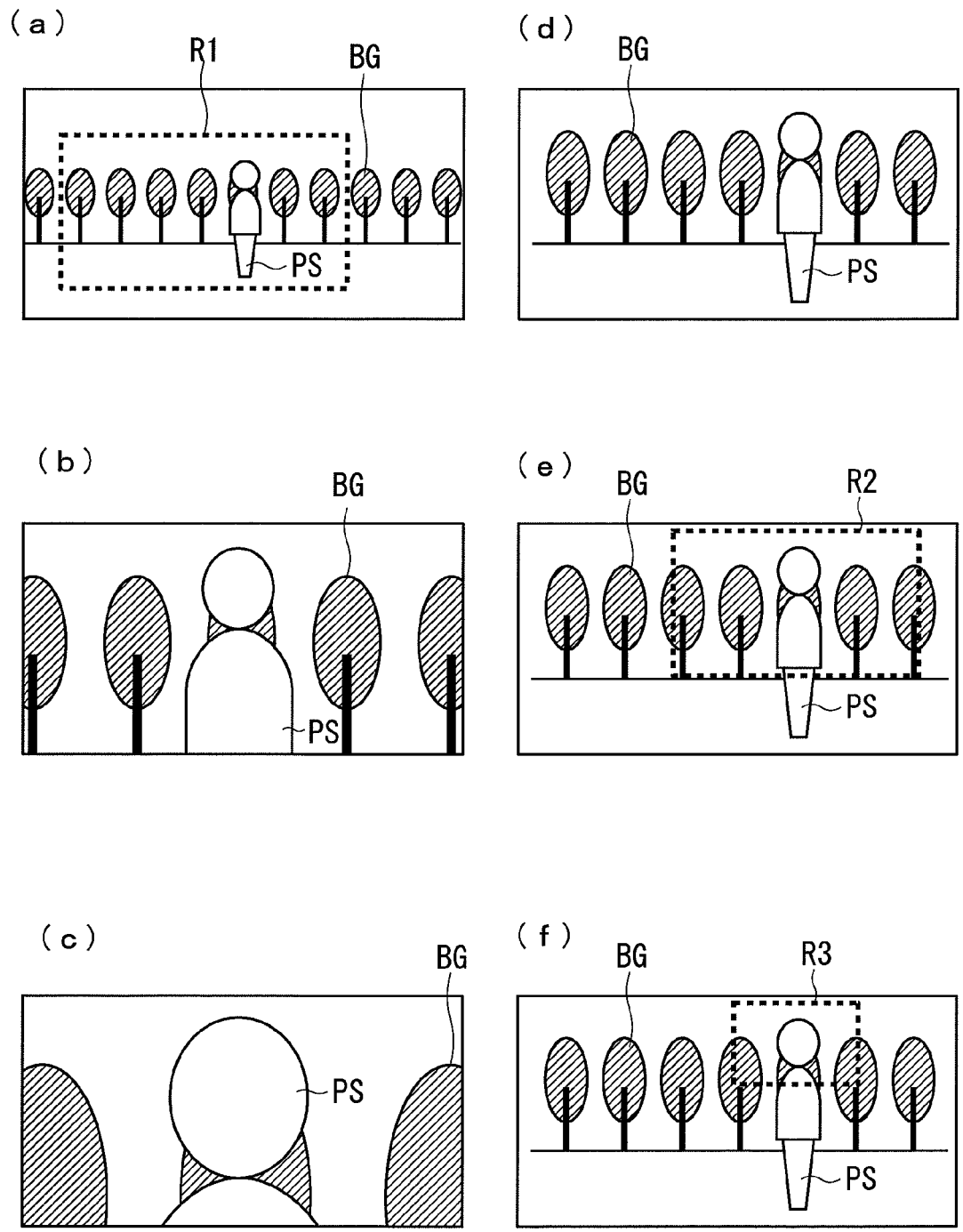

F I G. 1 1
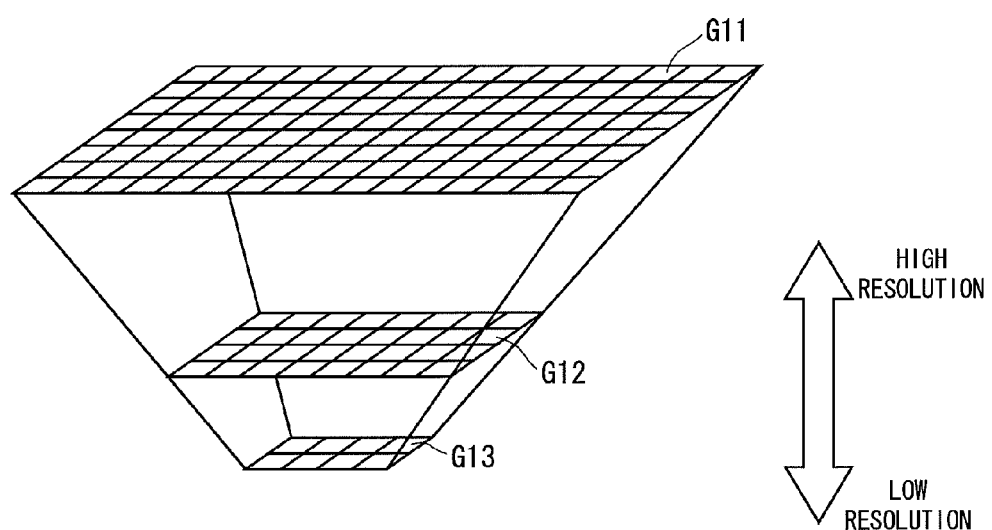

FIG. 14
(a)
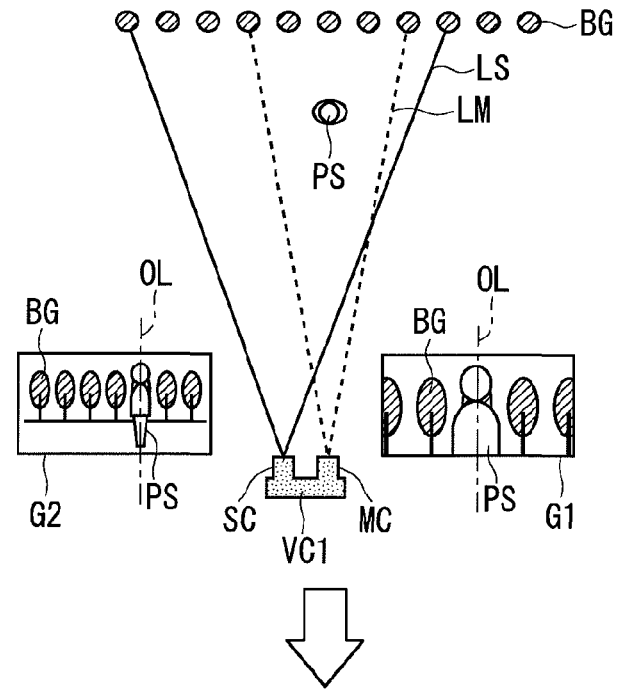
(b)
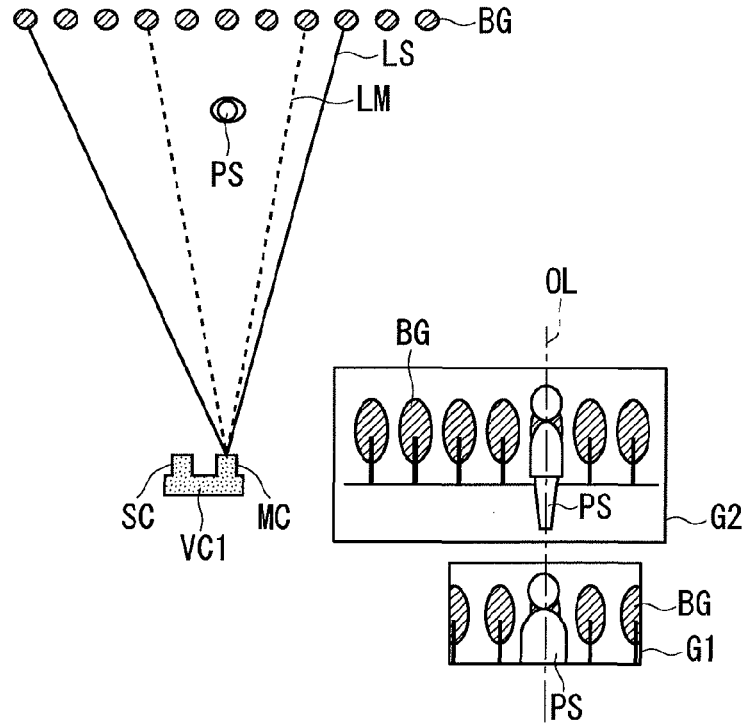

F I G. 1 5
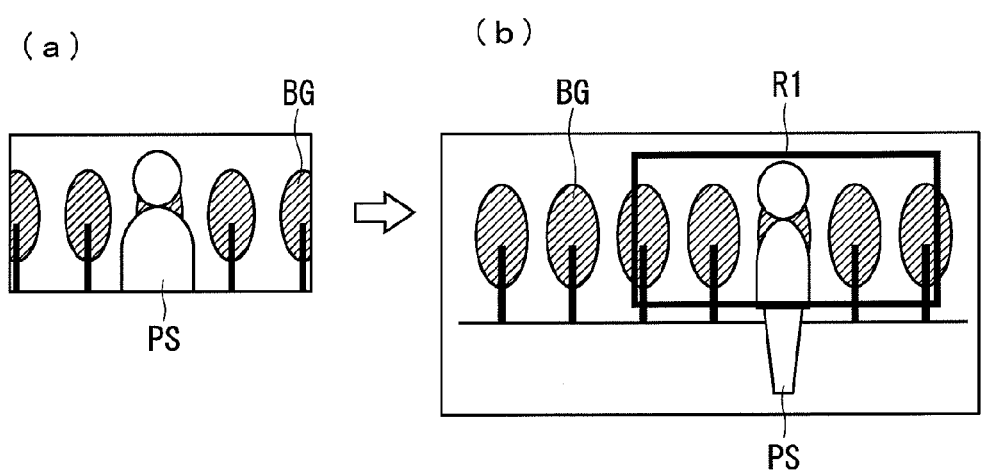

F I G. 1 6
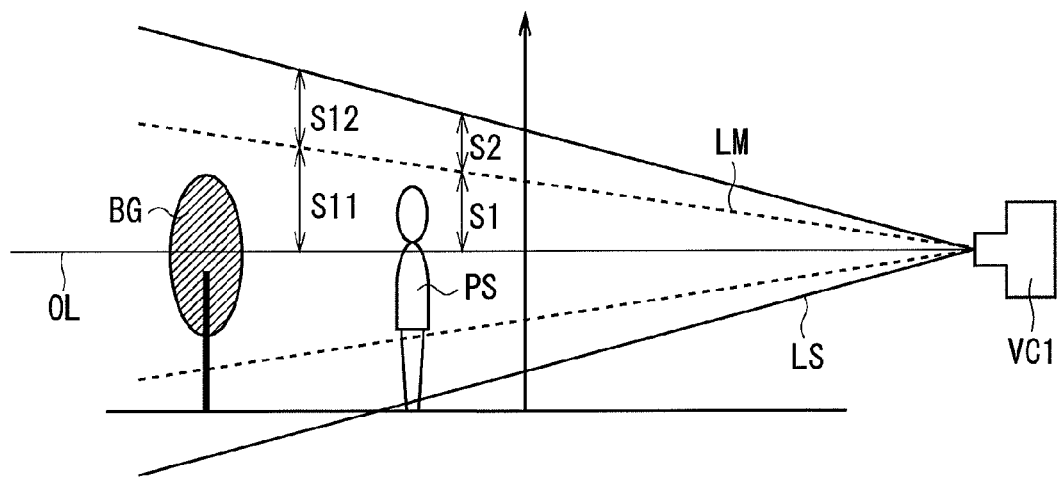
F I G. 1 7
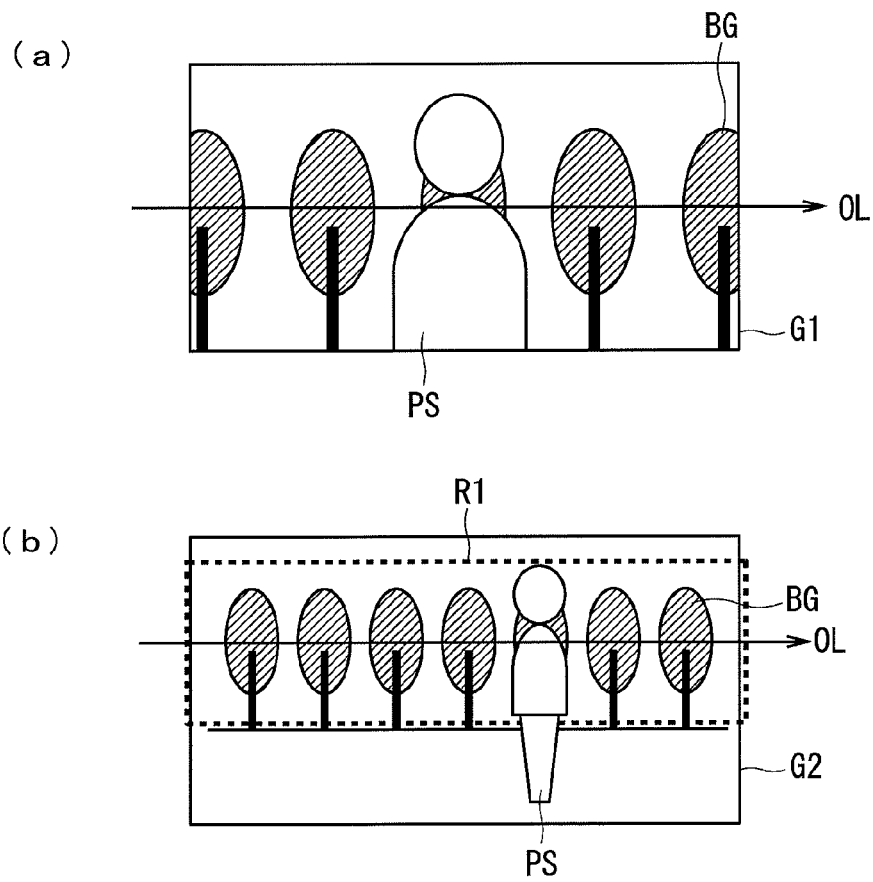

F I G. 2 6
(a)
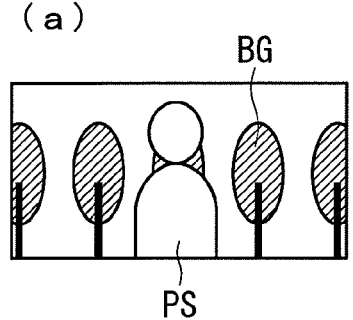
(b)
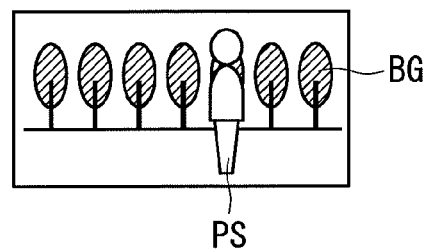
(c)
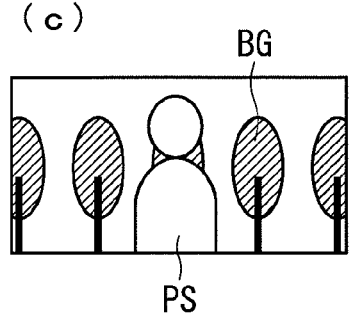
(d)
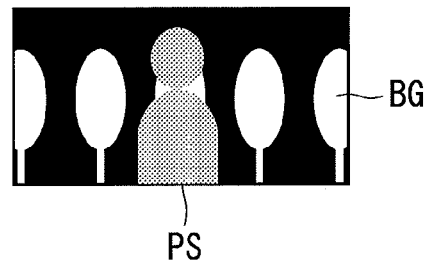
(e)
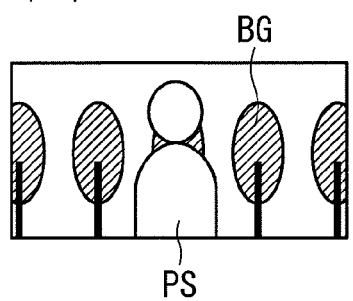
(f)
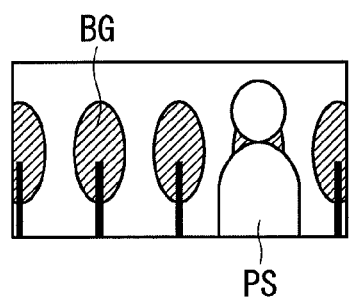

F I G . 2 7
(a)
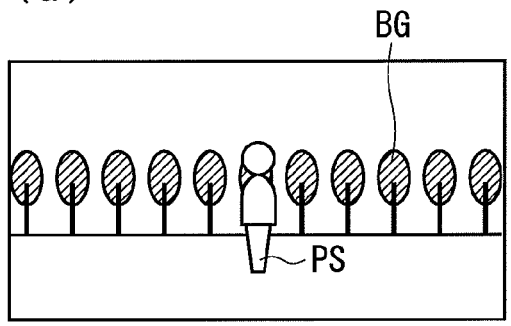
(b)
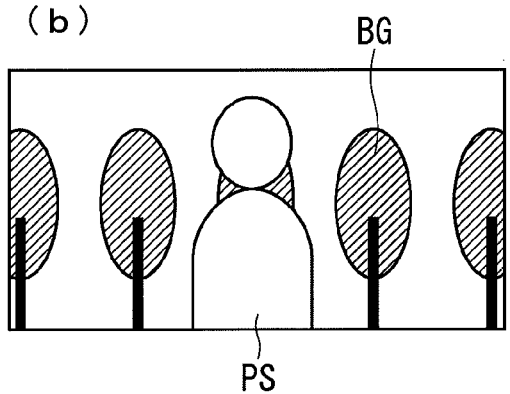
(c)
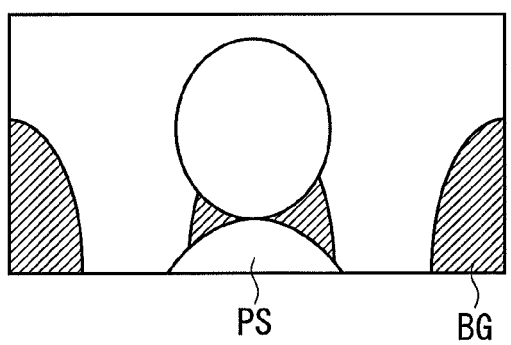
(d)
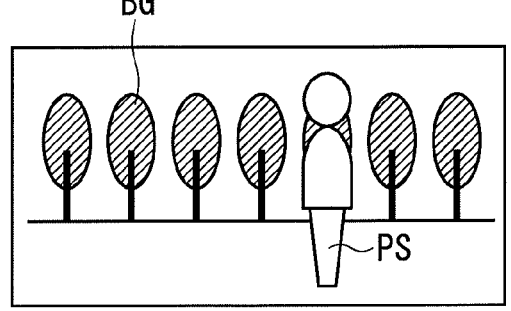
(e)
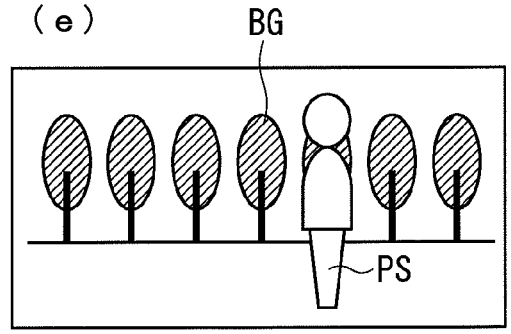
(f)
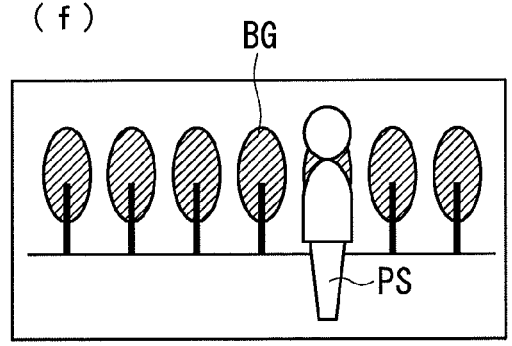

FIG. 28
(a)
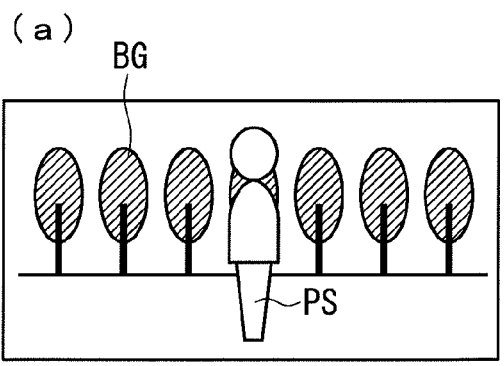
(d)
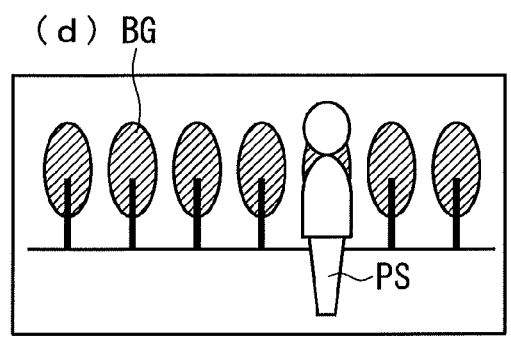
(b)
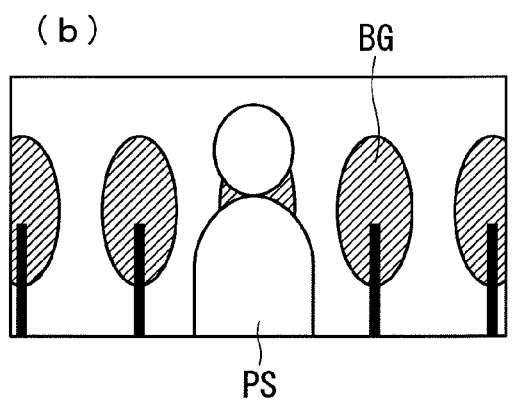
(e)
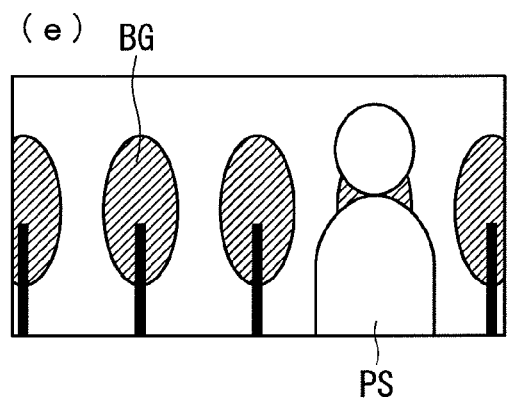
(c)
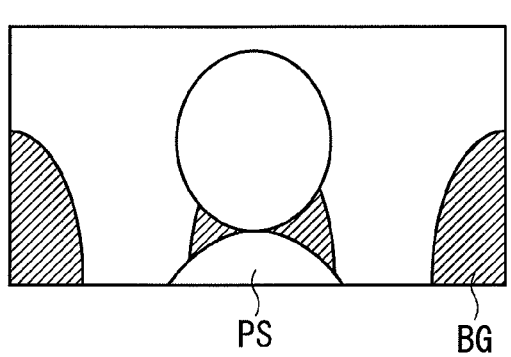
(f)
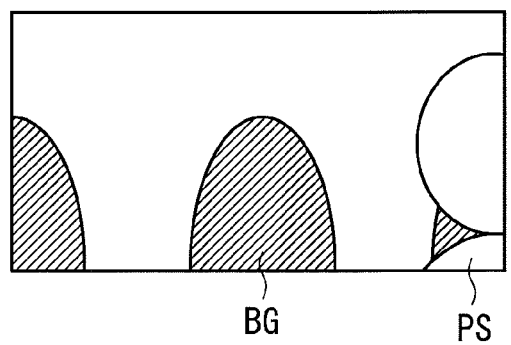

FIG. 29
(a) 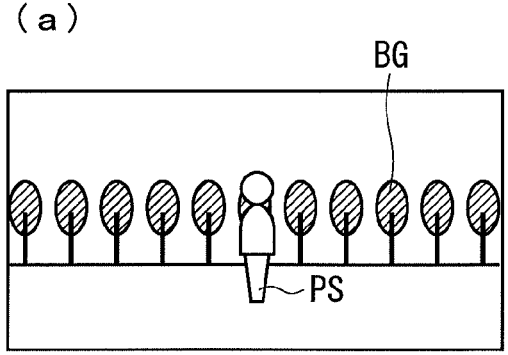
(b) 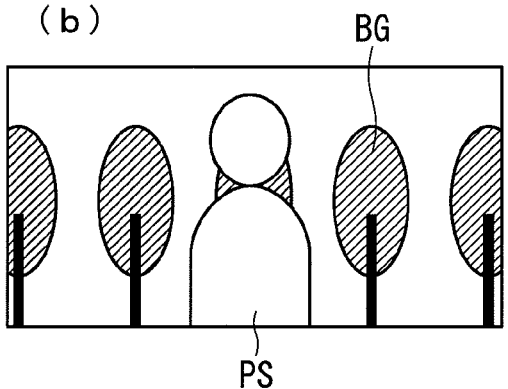
(c) 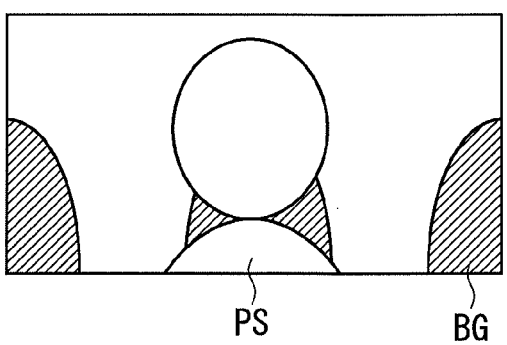
(d) 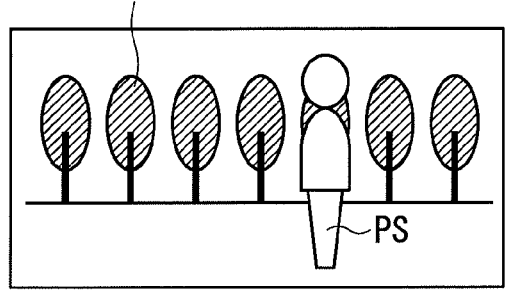
(e) 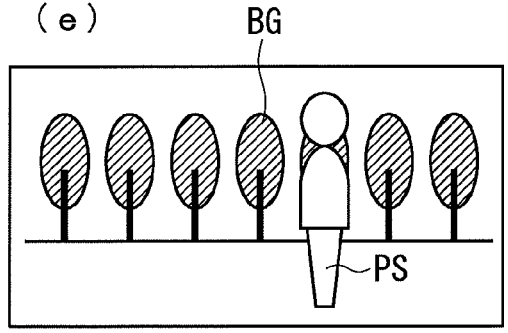
(f) 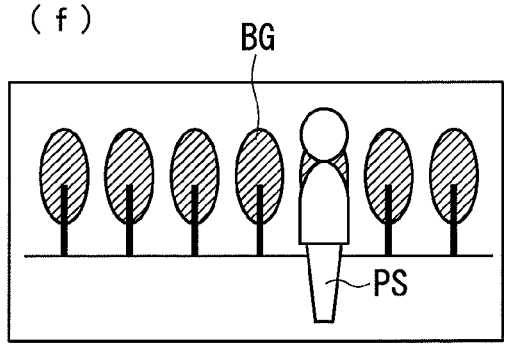

FIG. 30
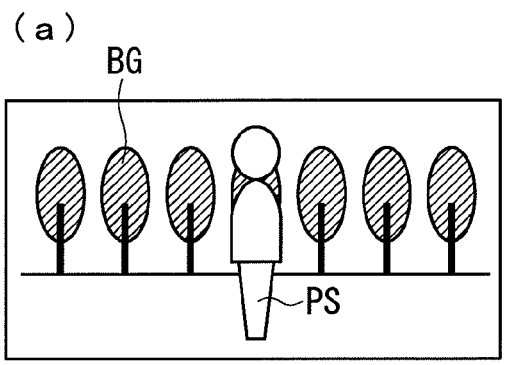
(a)
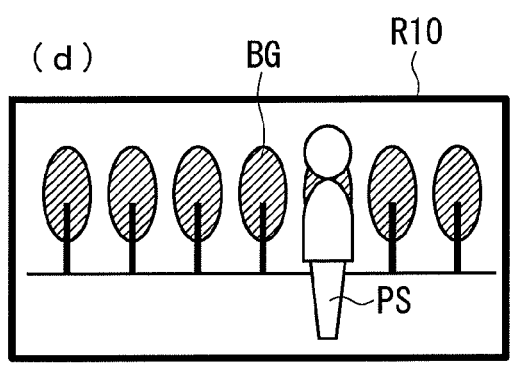
(d)
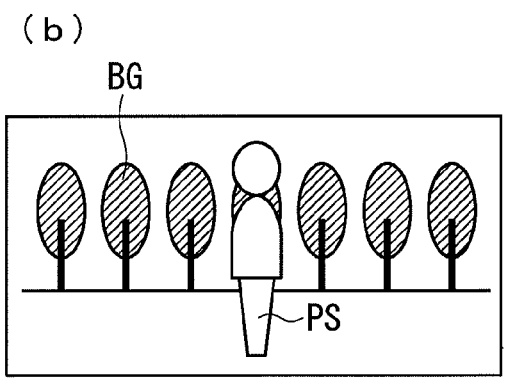
(b)
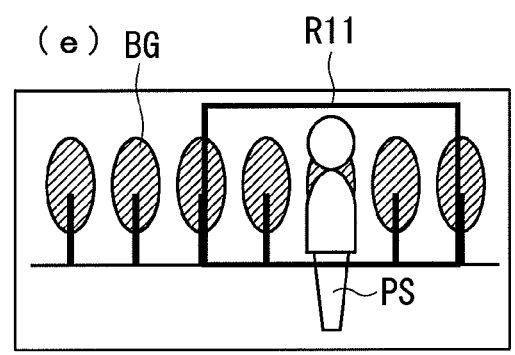
(e)
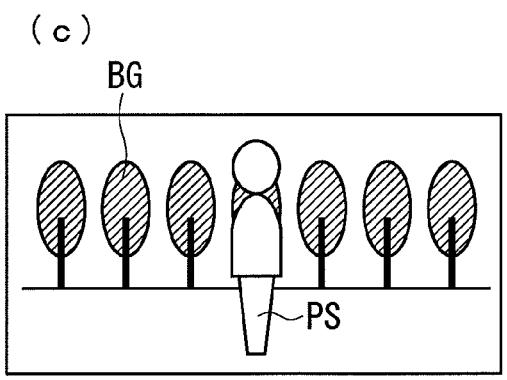
(c)
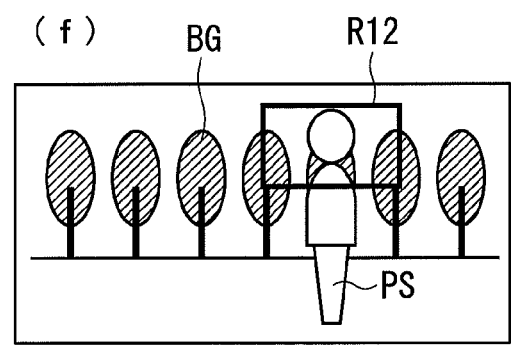
(f)

F I G . 3 2
(a)
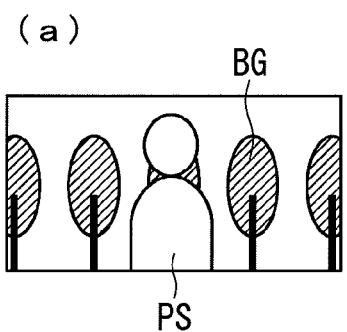
(b)
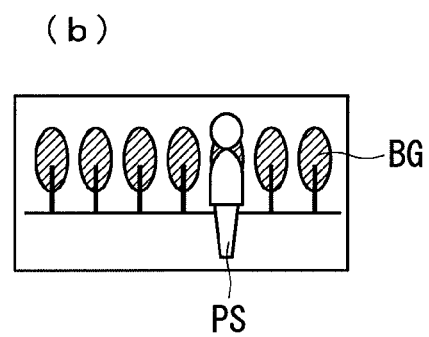
(c)
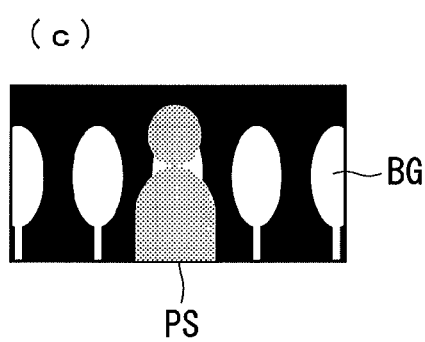
(d)
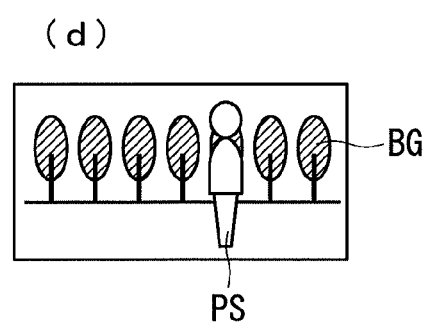
(e)
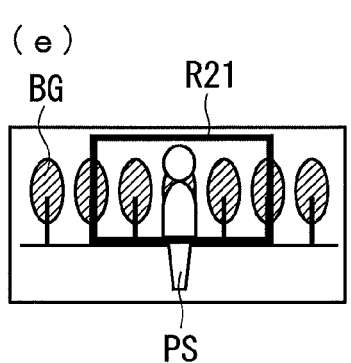
(f)
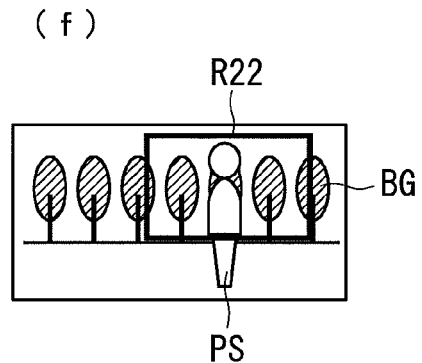

FIG. 35
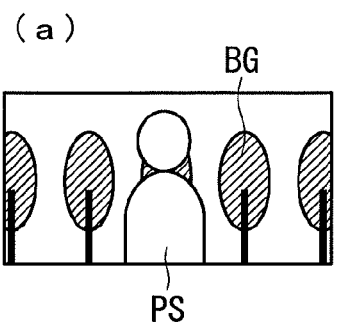
(a)
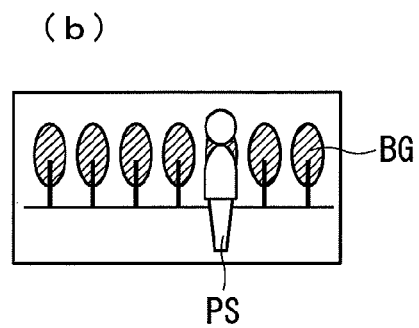
(b)
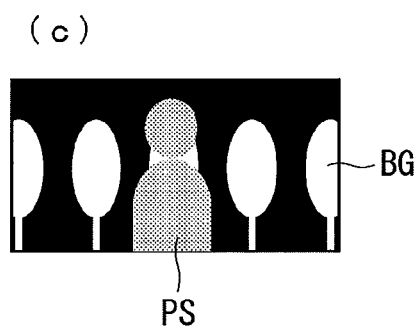
(c)
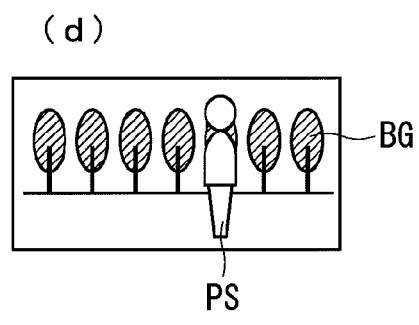
(d)
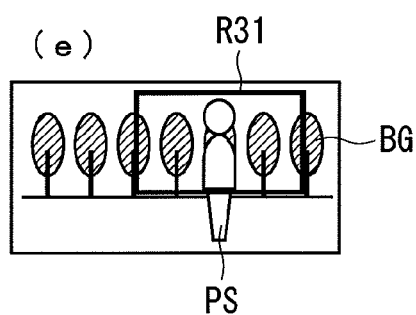
(e)
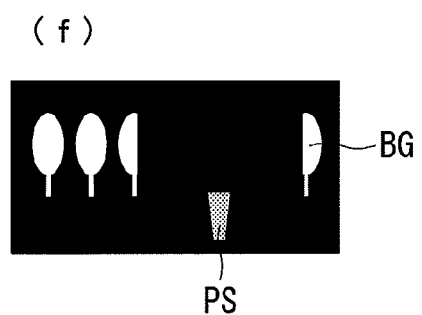
(f)
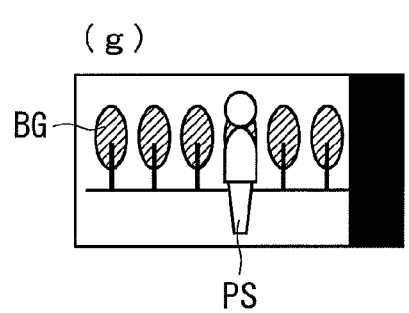
(g)
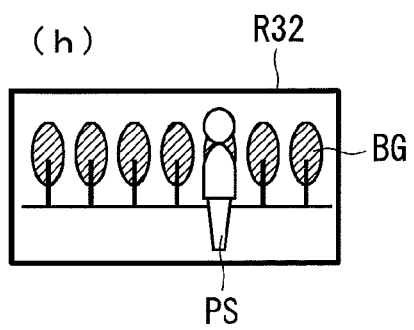
(h)

F I G . 3 8
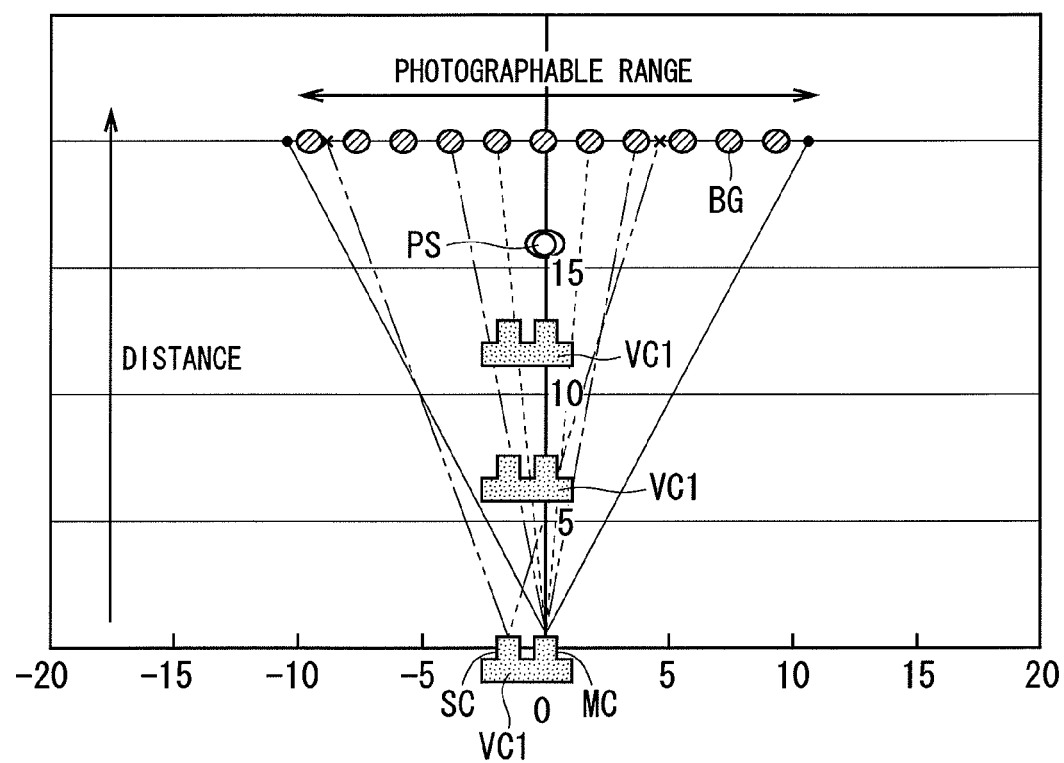

FIG. 40
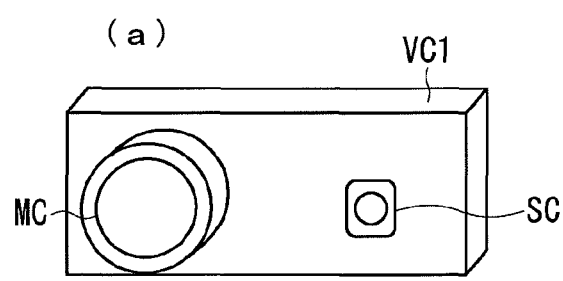
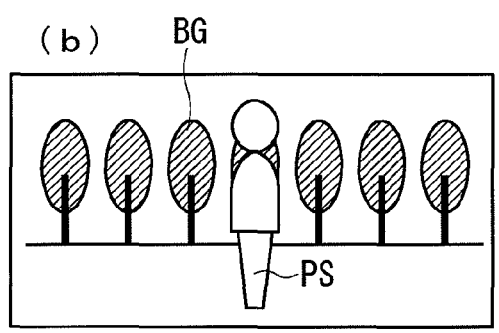
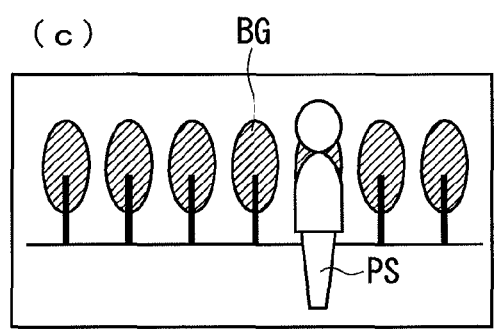
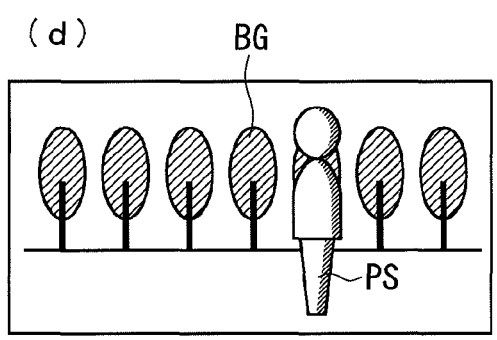

STEREO CAMERA

This application is the National Stage Application of International Patent Application No. PCT/JP2011/050319, filed Jan. 12, 2011.

TECHNICAL FIELD

The present invention relates to a stereo camera, and particularly relates to a stereo camera provided with a pair of cameras having different camera parameters.

BACKGROUND ART

A stereo camera provided with a pair of cameras is capable of generating a distance image including information of a distance to a photographic subject based on a parallax of images obtained by the both cameras, but in the stereo camera, the paired cameras are typically made up of cameras having the same camera parameters.

For example, Patent Document 1 discloses a configuration where a three-dimensional picture including distance information is picked up by horizontally arranged two lenses and a two-dimensional image is picked up by another lens different from the above, and discloses a configuration where a three-dimensional video picture is acquired within a certain range of a focal distance and a two-dimensional image is acquired in the case beyond that range, but the two lenses for a three-dimensional picture are constituted of lenses having the same characteristics.

Further, Patent Document 2 discloses a system to create an image for stereo viewing which is seen from an arbitrary view point based on images and distance information obtained by a stereo camera, and image processing for creating images for stereo viewing is performed on the assumption that two cameras constituting the stereo camera have the same camera parameters.

PRIOR ART DOCUMENT

Patent Documents

Patent Document 1: Japanese Patent Application Laid-Open No. 2004-297540
Patent Document 2: Japanese Patent Application Laid-Open No. 2009-124308

SUMMARY OF THE INVENTION

Problems to be Solved by the Invention

As described above, there has been a problem with the conventional stereo cameras in that, although paired cameras are configured of cameras having the same camera parameters, manufacturing cost increases when the cameras are both configured of high-performance cameras.

The present invention was made for solving the problem as described above, and an object thereof is to provide a stereo camera capable of generating stereo view images from an arbitrary view point, while suppressing manufacturing cost.

Means for Solving the Problems

A first aspect of a stereo camera according to the present invention includes: a first imaging part which photographs a first image; a second imaging part which has camera parameters different from those of the first imaging part and photographs a second image; a distance information acquiring part which associates each pixel in the first and second images and acquires distance information including parallax information; and a right/left image generating part which generates a stereo view image based on one of the first and second images and the distance information.

In a second aspect of the stereo camera according to the present invention, the distance information acquiring part decides a correspondence detection area where correspondence detection is performed, based on photographing information at the time of photographing the first and second images.

In a third aspect of the stereo camera according to the present invention, the distance information acquiring part regards one of the first and second images as a template and performs template matching with the other, to decide an area with the highest degree of agreement as the correspondence detection area.

In a fourth aspect of the stereo camera according to the present invention, when the first and second images have different photographing magnifications, the distance information acquiring part performs transformation of resolution processing on an image to become the template, so as to create the template.

In a fifth aspect of the stereo camera according to the present invention, the distance information acquiring part extracts object candidate areas that become object candidates by object recognition with respect to the first and second images, and performs comparison among the obtained object candidate areas, to decide an area with the highest degree of agreement as the correspondence detection area.

In a sixth aspect of the stereo camera according to the present invention, the distance information acquiring part sets an optical axial center of the other image on one image with respect to the first and second images, aligns the optical axial center of the other image set on the one image with the optical axial center of the other image, converts the one image to an image size fitted with an imaging device having photographed the other image and superimposes the images, to decide the correspondence detection area.

In a seventh aspect of the stereo camera according to the present invention, the distance information acquiring part decides, with respect to the first and second images, the correspondence detection area at a ratio of vertical angles of view centered on the optical axial centers.

In an eighth aspect of the stereo camera according to the present invention, the distance information acquiring part decides one-dimensional area along epipolar lines as the correspondence detection area with respect to the first and second images.

In a ninth aspect of the stereo camera according to the present invention, the distance information acquiring part sets, with respect to the respective correspondence detection areas of the first and second images, a base position inside the area to be on the base side of correspondence detection to a position of a sub-pixel having a finer size than a pixel size, to perform correspondence detection.

In a tenth aspect of the stereo camera according to the present invention, the distance information acquiring part regards an image having the correspondence detection area with a larger number of pixels as a base image, out of the respective correspondence detection areas of the first and second images, to perform correspondence detection.

In an eleventh aspect of the stereo camera according to the present invention, when zoom photographing is performed at the time of photographing the first and second images, the distance information acquiring part changes a sampling interval of corresponding points in accordance with a zooming degree.

In a twelfth aspect of the stereo camera according to the present invention, the distance information acquiring part decreases a sampling interval of corresponding points with increase in zoom magnification.

In a thirteenth aspect of the stereo camera according to the present invention, the distance information acquiring part changes a sampling interval of corresponding points in accordance with the number of pixels of one with a smaller number of pixels out of the respective correspondence detection areas of the first and second images.

In a fourteenth aspect of the stereo camera according to the present invention, when a window for use in correspondence detection is applied to an object surface, the distance information acquiring part sets an aspect ratio of the window such that the aspect ratio on the object surface is isotropic, to perform correspondence detection.

In a fifteenth aspect of the stereo camera according to the present invention, the first imaging part has a higher resolution than the second imaging part, and the right/left image generating part regards the first image as a main image, displaces an image in the correspondence detection area inside the second image in accordance with the parallax information, and regards the first image and the new second image as the right/left images.

In a sixteenth aspect of the stereo camera according to the present invention, when the number of pixels inside the correspondence detection area of the second image is smaller than the number of pixels inside the correspondence detection area of the first image, the right/left image generating part compensates pixel information from the first image.

In a seventh aspect of the stereo camera according to the present invention, the first imaging part has a higher resolution than the second imaging part, and when the second image has a higher photographing magnification than the first image, the right/left image generating part embeds the second image into the first image to generate a new second image, and regards the first image and the new second image as the right/left images.

In an eighteenth aspect of the stereo camera according to the present invention, the first imaging part has a higher resolution than the second imaging part, and when the first image has a higher photographing magnification than the second image, the right/left image generating part embeds the first image into the second image to generate a new first image, and regards the new first image and the second image as the right/left images.

In a nineteenth aspect of the stereo camera according to the present invention, the first imaging part has a zoom function, and when the first image is a zoomed image, the right/left image generating part generates an image with a changed baseline length in accordance with a zoom magnification, to generate a new first image.

In a twentieth aspect of the stereo camera according to the present invention, when generating the new first image, the right/left image generating part changes an image size so as to hold a photographic subject within an image even with a change in base-line length.

In a twenty-first aspect of the stereo camera according to the present invention, a lens of the second imaging part is a fovea lens.

In a twenty-second aspect of the stereo camera according to the present invention, a lens of the second imaging part is an anamorphic lens.

In a twenty-third aspect of the stereo camera according to the present invention, the first imaging part has a higher resolution than the second imaging part, the stereo camera further includes a sensor which senses arrangement of the stereo camera with the first and second imaging part arrayed in a horizontally placed manner in parallel with a horizontal plane, and stops an operation of the distance information acquiring part in the case of sensing horizontal placement, and the right/left image generating part provides information of the first image to the second image to create a new second image, and regards the first image and the new second image as the right/left images.

Effects of the Invention

According to the first aspect of the stereo camera concerning the present invention, it is possible to obtain stereo view images even when the stereo camera is one having two imaging parts with different camera parameters, and hence it is possible to generate the stereo view images at low cost.

According to the second aspect of the stereo camera concerning the present invention, it is possible to decide a correspondence detection area based on photographing information, such as zoom magnifications, at the time of photographing first and second images.

According to the third aspect of the stereo camera concerning the present invention, it is possible to decide the correspondence detection by template matching.

According to the fourth aspect of the stereo camera concerning the present invention, even when the first and second images have different photographing magnifications, it is possible to decide the correspondence detection area by template matching.

According to the fifth aspect of the stereo camera concerning the present invention, it is possible to decide the correspondence detection area by object recognition.

According to the sixth aspect of the stereo camera concerning the present invention, it is possible to decide with ease the correspondence detection area by use of optical axial centers.

According to the seventh aspect of the stereo camera concerning the present invention, it is possible to decide the correspondence detection area at the ratio of vertical angles of view centered on the optical axial centers of the first and second images.

According to the eighth aspect of the stereo camera concerning the present invention, it is possible to decide the correspondence detection area by means of one-dimensional areas along epipolar lines with respect to the first and second images.

According to the ninth aspect of the stereo camera concerning the present invention, since a base position inside the area to be on the base side of correspondence detection is set to a sub-pixel position to perform correspondence detection, even when a base image and a reference image have different magnifications, it is possible to make the sampling intervals uniform.

According to the tenth aspect of the stereo camera concerning the present invention, it is possible to perform correspondence detection, regarding one with a larger number of pixels as the base image.

According to the eleventh and twelfth aspects of the stereo camera concerning the present invention, since a sampling interval of corresponding points is changed in accordance with a zooming degree, it is possible to reduce the time spent for correspondence detection in the case of no use of zooming.

According to the thirteenth aspect of the stereo camera concerning the present invention, since a sampling interval of corresponding points is changed in accordance with the number of pixels of one with a smaller number of pixels out of the correspondence detection areas, it is possible to deal with the case of the first image and the second image having different numbers of pixels due to zooming.

According to the fourteenth aspect of the stereo camera concerning the present invention, when a window for use in correspondence detection is applied to an object surface, an aspect ratio of the window is set such that the aspect ratio on the object surface is isotropic, to perform correspondence detection, whereby it is possible to prevent deterioration in accuracy of association in correspondence detection.

According to the fifteenth and sixteenth aspects of the stereo camera concerning the present invention, the second image is a high-resolution image of the same level as the first image and both images are used as stereo view images, whereby it is possible to make a three-dimensional display free from incompatibility.

According to the seventeenth and eighteenth aspects of the stereo camera concerning the present invention, it is possible to enhance accuracy of a stereo-viewable portion.

According to the nineteenth and twentieth aspects of the stereo camera concerning the present invention, a new first image with a base-line length changed in accordance with a zoom magnification is generated, whereby it is possible to make a three-dimensional display free from incompatibility.

In a twenty-first aspect of the stereo camera according to the present invention, the lens of the second imaging part is made of a fovea lens, whereby it is possible to obtain an image with a large amount of information of the central part.

In a twenty-second aspect of the stereo camera according to the present invention, the lens of the second imaging part is made of an anamorphic lens, whereby it is possible to obtain an image with a wide angle of view in one direction.

According to the twenty-third aspect of the stereo camera concerning the present invention, it is possible to obtain the stereo view images by simple processing.

BRIEF DESCRIPTION OF THE DRAWINGS

FIG. 4 is a view schematically showing a concept of generation of stereo view images.

FIG. 6 is a view showing images obtained by the stereo camera.

FIG. 9 is as conceptual view describing setting processing for a correspondence detection area.

FIG. 11 is a view describing a transformation of resolution processing.

FIGS. 14 to 15 are views describing a fourth method for deciding a correspondence detection area.

FIGS. 16 to 17 are views describing a fifth method for deciding a correspondence detection area.

FIGS. 26 to 28 are views describing a first method for generating right/left images.

FIGS. 29 to 30 are views describing a modified example of the first method for generating right/left images.

FIGS. 32 to 34 are views describing a second method for generating right/left images.

FIG. 35 is a view describing Modified Example 1 of the second method for generating right/left images.

FIG. 38 is a diagram describing a fourth method for generating right/left images.

FIGS. 39 to 40 are views describing the fourth method for generating right/left images.

EMBODIMENT FOR CARRYING OUT THE INVENTION

Summary of the Invention

First, a summary of the present invention will be described using FIGS. 1 to 6.

Figure 1:
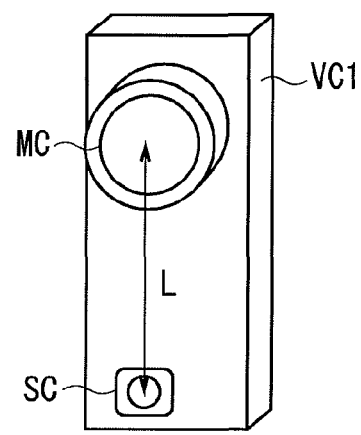
FIGS. 1 to 3 are views describing a usage pattern of a stereo camera according to the present invention.
Figure 2:
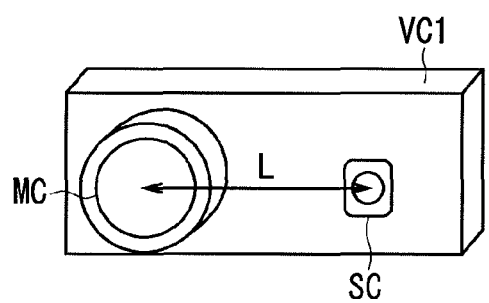
Figure 3:
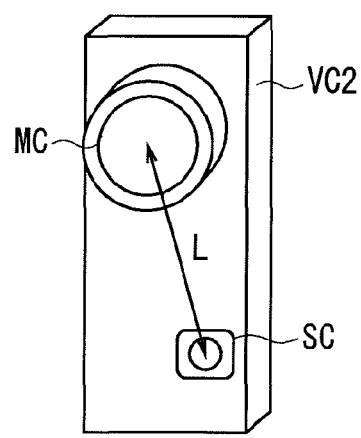

FIGS. 1 to 3 are views describing usage patterns of a stereo camera according to the present invention. FIG. 1 shows an example of using a stereo camera VC1 in a vertically placed manner, and FIG. 2 shows an example of using the stereo camera VC1 in a horizontally placed manner.

The stereo camera VC1 takes a configuration where a main camera MC and a sub-camera SC are arranged apart from each other just by a base-line length L, and the main camera MC and the sub-camera SC are arrayed so as to be in parallel with one side of a camera case. It is to be noted that the main camera MC and the sub-camera SC can be referred to as an imaging part inside the stereo camera VC1.

The main camera MC is a digital camera system having a so-called zoom lens with a high resolution and a variable focus, such as a lens compatible with high-definition TV broadcasting (HDTV lens) or the like. The sub-camera SC is a digital camera system with a low resolution and a single focus, such as a small-sized unit camera installed in a mobile phone or the like, or a micro camera unit (MCU). Note that as a lens for the sub-camera SC, the zoom lens may be used, but a high resolution is not required. Further, a variable-power lens may be used such as a fovea lens (having a characteristic that an image at the rim is significantly compressed as compared with an image at the center), a fish-eye lens or an anamorphic lens.

An image with a large amount of information at the central part is obtained by use of the fovea lens or the fish-eye lens, and an image with a wide angle of view in one direction is obtained by use of the anamorphic lens.

A state where the stereo camera VC1 is arranged such that the main camera MC and the sub-camera SC are arrayed vertically to a horizontal plane is referred to as vertical placement. On the other hand a state where the stereo camera VC1 is arranged such that the main camera MC and the sub-camera SC are arrayed parallelly to the horizontal plane, is referred to as horizontal placement.

Moreover, a stereo camera VC2 shown in FIG. 3 is the same as the stereo camera VC1 in that the main camera MC and the sub-camera SC are arranged apart from each other just by a base-line length L, but the main camera MC and the sub-camera SC are arrayed so as to be diagonal to any side of the camera case. FIG. 3 shows a state where the arrangement is made such that the main camera MC and the sub-camera SC are arrayed as inclined from the verticality to the horizontal plane, and the state is referred to as vertical placement. A state rotated at 90 degrees with respect to this state is referred to as horizontal placement. It is to be noted that the arrangement may be made such that the cameras vertically or horizontally change places with respect to the arranged states as described above.

Although a conventional stereo camera is typically horizontally placed, the stereo camera according to the present invention can be vertically placed. An advantage of the vertical placement is that the camera has a vertically long structure similar to that of a conventional camcorder, and is configured to be compact and have the ease of operation free from incompatibility.

FIG. 4 is a view schematically showing a concept of generation of stereo view images by means of the stereo camera VC1 shown in FIG. 1. Part (a) of FIG. 4 shows a high-resolution two-dimensional image obtained by the main camera MC, and part (b) of FIG. 4 shows a low-resolution two-dimensional image obtained by the sub-camera SC. Although the two cameras pick up images of the same photographic subject PS and background BG, images with different sizes of the photographic subject PS and different angles of view are obtained due to different magnifications of the lenses.

Part (c) of FIG. 4 shows an image created from the images of part (a) and part (b) of FIG. 4, and part (d) of FIG. 4 shows an image obtained by the main camera MC. A three-dimensional display is made using such two images, and hence such two images are referred to as stereo view images. Using such stereo view images, a three-dimensional display is made on a display.

Using such stereo view images, the stereo camera VC1 performs a three-dimensional display on the display where the photographic subject PS is stereoscopically viewable, as shown in part (e) of FIG. 4.

Figure 5:
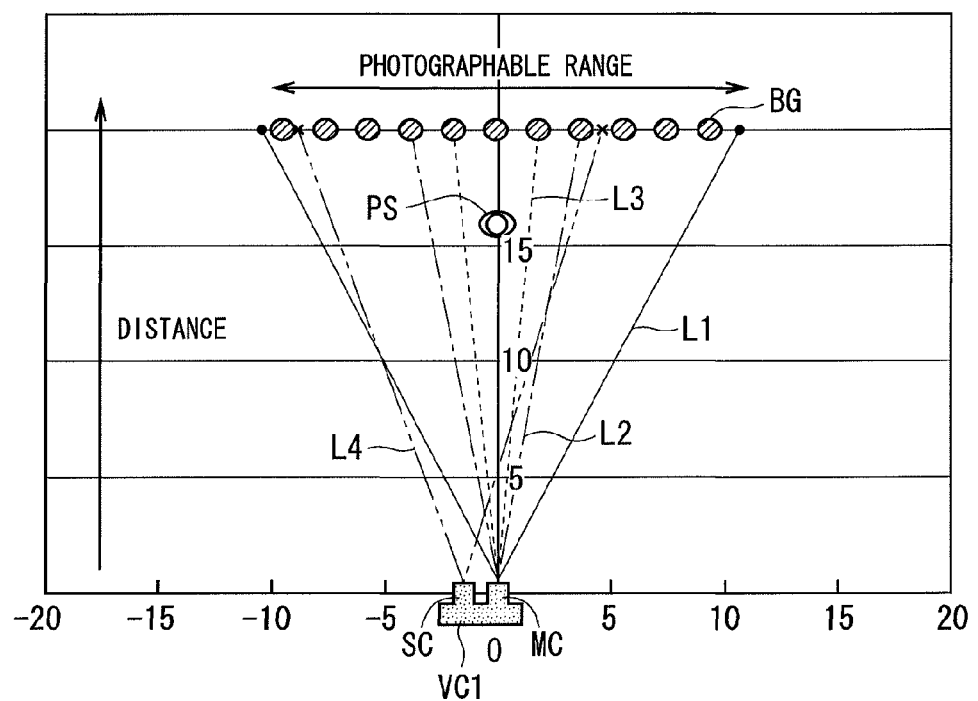
FIG. 5 is a diagram showing photographed images in the case of using the stereo camera in a horizontally placed manner.

FIG. 5 is a diagram showing photographed images in the case where the stereo camera VC1 is used in the horizontally placed manner, as well as a schematic diagram of the photographic subject PS and the background BG seen from the above, where a vertical axis indicates distances to the photographic subject PS and the background BG, while a horizontal axis indicates a horizontal length in the case where an optical axis of the main camera MC is regarded as an original point and indicates horizontal angles of view in the case where photographing is performed by means of the main camera MC and the sub-camera SC. As for the main camera MC, examples of photographing with three steps of magnification are shown, and an image photographed in the state of the lowest magnification (the widest angle of view) is referred to as a first main camera image, and its angle of view is indicated by a line L1. An image photographed in the state of the second highest magnification is referred to as a second main camera image, and its angle of view is indicated by a line L2. Then, an image photographed in the state of the highest magnification (the narrowest angle of view) is referred to as a third main camera image, and its angle of view is indicated by a line L3. On the other hand, the sub-camera SC has no zoom function, thus having only one kind of angle of view, and that angle of view is indicated by a line L4.

FIG. 6 shows images obtained by the photographed images shown in FIG. 5. Part (a) of FIG. 6 shows a first main camera image photographed by the main camera MC, part (b) of FIG. 6 shows a second main camera image photographed by the main camera MC, and part (c) of FIG. 6 shows a third main camera image photographed by the main camera MC.

Further, part (d), part (e) and part (f) of FIG. 6 respectively show images obtained by the sub-camera SC at the time of acquiring the images of part (a) to part (c) of FIG. 6. Any of the sub-camera images is an image with the same magnification. It is to be noted that, since an optical axis of the sub-camera SC is apart from the main camera MC just by the base-line length L, there is seen a difference, associated with a parallax, between the image obtained by the sub-camera SC and the image obtained by the main camera MC. Further, the main camera MC and the sub-camera SC are different from each other in magnification, and are also different in sizes of the photographic subject PS and the background BG.

As thus described, generating stereo view images by use of images obtained by the cameras having different camera parameters is the greatest feature of the present invention.

Embodiments

Figure 7:
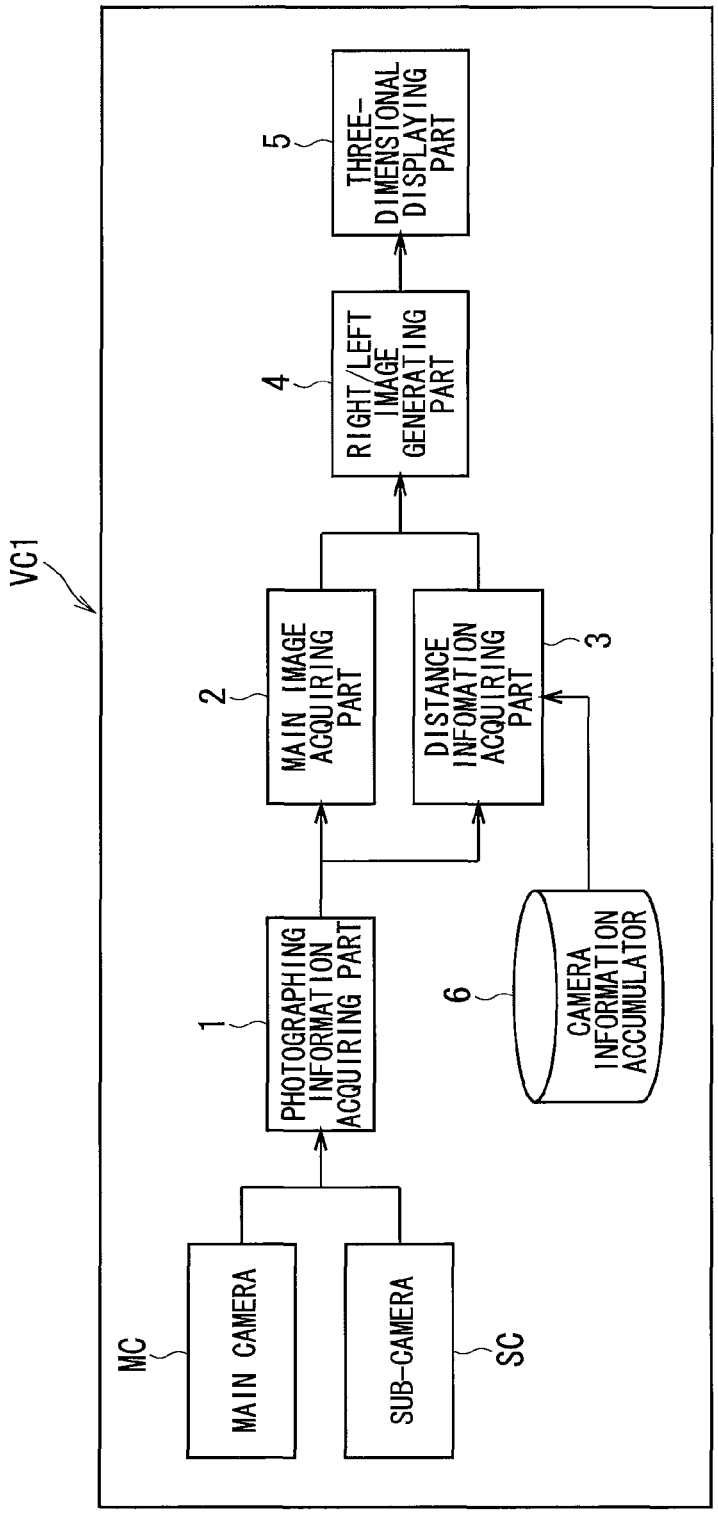
FIG. 7 is a block diagram showing a configuration of the stereo camera according to the present invention.

FIG. 7 is a block diagram showing the configuration of the stereo camera VC1. As shown in FIG. 7, the main camera MC and the sub-camera SC are connected to a photographing information acquiring part 1, and photographing information is provided to the photographing information acquiring part 1 along with image data obtained by the respective cameras. Then, one of image data of the images obtained by the main camera MC and the sub-camera SC is provided as a main image to a main image acquiring part 2 via the photographing information acquiring part 1. Further, image data obtained by the main camera MC and the sub-camera SC are provided to the distance information acquiring part 3 via the photographing information acquiring part 1, to acquire distance information. In addition, it is configured that known camera information is provided from a camera information accumulator 6 to the distance information acquiring part 3 for acquiring distance information.

A main image outputted from the main image acquiring part 2 and distance information outputted from the distance information acquiring part 3 are provided to a right/left image generating part 4, to generate stereo view images. Then, the obtained stereo view images (right/left images) are provided to a three-dimensional displaying part 5, such as a liquid crystal screen, and then three-dimensionally displayed.

<Acquisition of Photographing Information>

In the photographing information acquiring part 1, photographing information is acquired at the time of acquiring the image as shown in FIG. 6. The photographing information acquired at this time is a parameter such as a zoom magnification, a focal distance, an angle of view, which may vary at the time of photographing. However, all the information of the zoom magnification, the focal distance and the angle of view is not necessary, and as long as any one of the information is obtained, the other information can be worked out by calculation.

For example, when a vertical dimension (h), a horizontal dimension (w) and a diagonal angle dimension (d) of a light receiver such as a CCD sensor are decided, an angle of view (θ) in each direction can be calculated by Mathematical Expression (1) below:

[Mathematical Expression 1]

$$\theta = 2\tan^{-1}\left(\frac{x}{2f}\right)[\text{rad}] = \frac{180}{\pi} \times 2\tan^{-1}\left(\frac{x}{2f}\right)[\text{deg}] \quad (1)$$

In Mathematical Expression (1) above, "f" denotes a focal distance, and "x" denotes the sizes (h, w, d) of the light receiver.

In addition, it may be configured such that in the case of the sub-camera SC using a single focus lens, photographing information is held as known camera information in the camera information accumulator 6.

<Acquisition of Distance Information>

Figure 8:
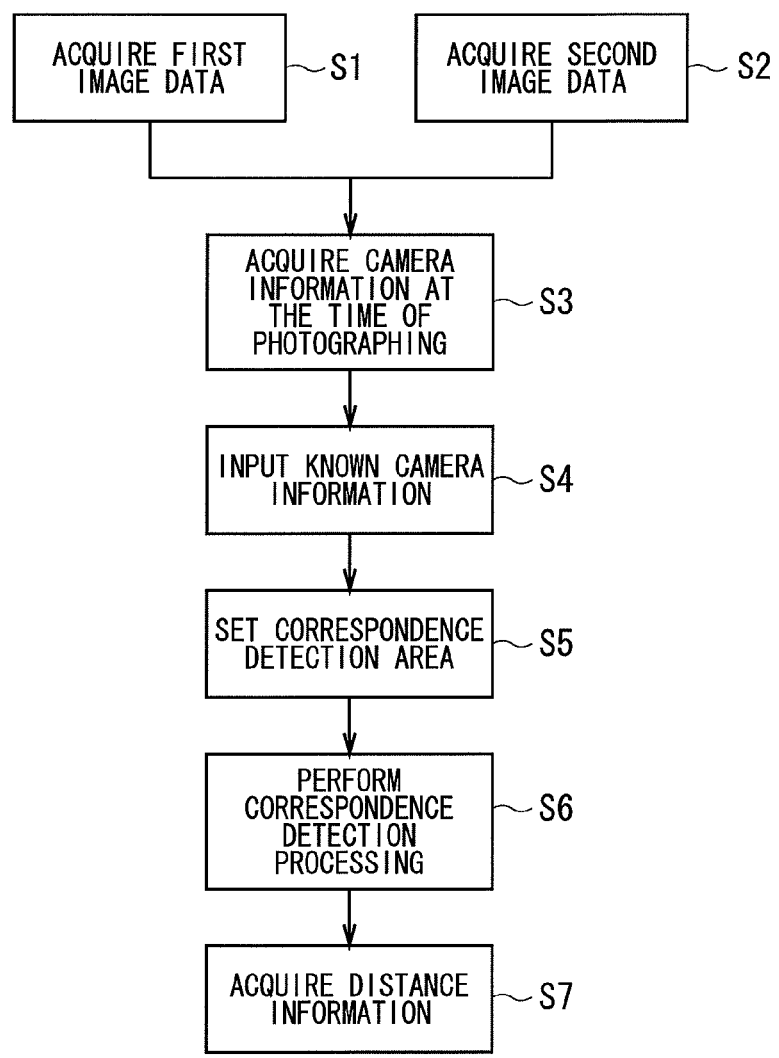
FIG. 8 is a flowchart showing a process procedure from acquisition of an image to acquisition of distance information.

Next, acquisition of distance information in the distance information acquiring part 3 will be described. FIG. 8 is a flowchart showing a process procedure from acquisition of an image to acquisition of distance information.

As shown in FIG. 8, first, a first image and a second image are respectively acquired in Steps S1 and S2. It should be noted that in the following description, the first image is regarded as an image obtained by the main camera MC and the second image is regarded as an image obtained by the sub-camera SC.

Next, in the photographing information acquiring part 1, camera information acquired at the time of photographing by each of the main camera MC and the sub-camera SC is acquired (Step S3).

Next, known camera information is acquired from the camera information accumulator 6 (step S4). This known camera information includes fixed photographing information in the sub-camera SC, and information of a dimension of the light receiver such as a CCD sensor and pixel disposed intervals (pixel pitches).

Next, in the distance information acquiring part 3, a correspondence detection area is set for performing correspondence detection with respect to the first and second images (Step S5).

Next, in the distance information acquiring part 3, correspondence detection processing for each pixel in the first and second images are performed (Step S6). Then, distance information is calculated based on the associated pixel, to acquire distance information (Step S7).

<Setting of Correspondence Detection Area>

Next, setting processing for a correspondence detection area will be described using FIGS. 9 to 18.

FIG. 9 is a conceptual view describing setting processing for a correspondence detection area. Part (a) of FIG. 9 shows a first main camera image photographed by the main camera MC, part (b) of FIG. 9 shows the second main camera image, and part (c) of FIG. 9 shows the third main camera image. Further, part (d), part (e), and part (f) of FIG. 9 respectively show images obtained by the sub-camera SC at the time of acquiring the images of part (a) to part (c) of FIG. 9.

In the first main camera image shown in part (a) of FIG. 9, an area R1 surrounded by a broken line is the correspondence detection area, and the whole of the sub-camera image shown in part (d) of FIG. 9 is an area corresponding to the area R1.

In the sub-camera image shown in part (e) of FIG. 9, an area R2 surrounded by a broken line is the correspondence detection area, and the whole of the second main camera image shown in part (b) of FIG. 9 is an area corresponding to the area R2.

Further in the sub-camera image shown in part (f) of FIG. 9, an area R3 surrounded by a broken line is the correspondence detection area, and the whole of the third main camera image shown in part (c) of FIG. 9 is an area corresponding to the area R3.

As thus described, in the pairs of the first to third main camera images and sub-camera images, processing for deciding the correspondence detection area is the setting processing for a correspondence detection area, and first to sixth methods described below can be adopted for decision of the correspondence detection area.

<First Method>

The first method is to decide the area by template matching where transformation of resolution processing is performed on either the first image obtained by the main camera MC or the second image obtained by the sub-camera SC, to generate a plurality of template images. Then, pattern matching with the other image is performed, to decide an area with the highest degree of agreement as a correspondence detection area.

Figure 10:
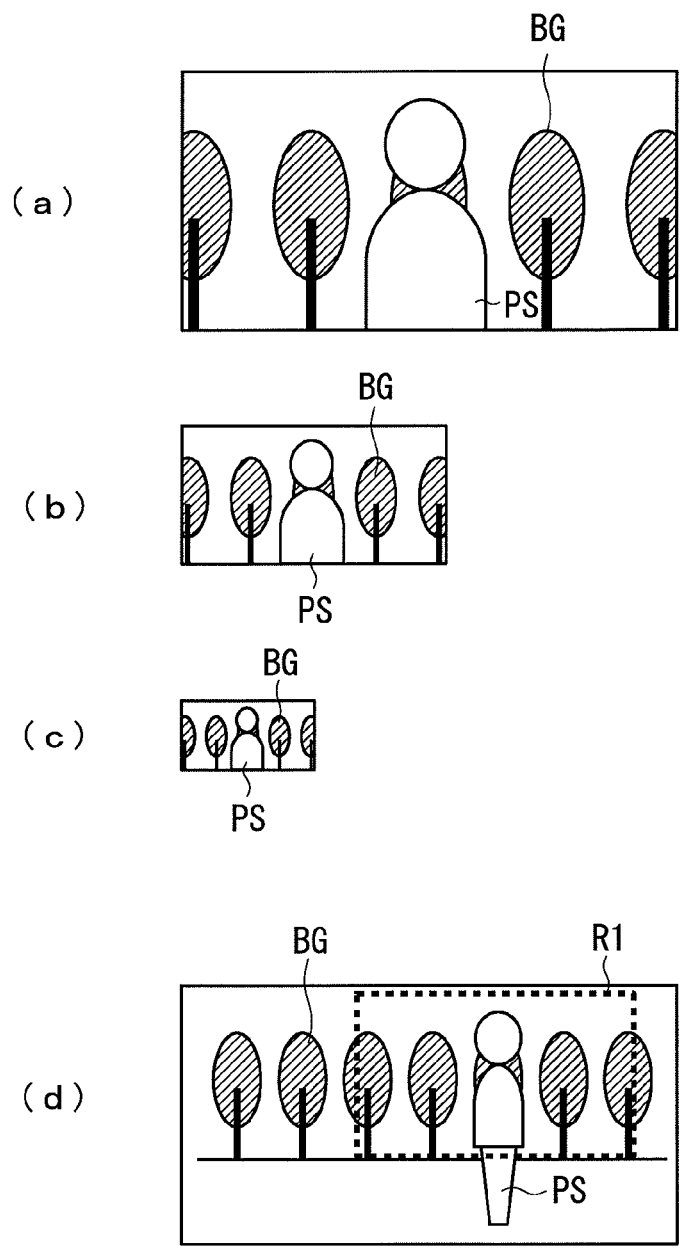
FIG. 10 is a view describing a first method for deciding a correspondence detection area.

FIG. 10 shows a conceptual diagram of the first method. Part (a), part (b) and part (c) of FIG. 10 show first, second and third template images G11, G12 and G13, created by use of the first image and respectively having different resolutions, and part (d) of FIG. 10 shows a sub-camera image as a comparison object.

FIG. 11 is a diagram showing a concept of the transformation of resolution processing where a first template image G11, a second template image G12 and a third template image G13 are hierarchically shown. As thus described, the transformation of resolution processing is processing of lowering a resolution to reduce a large image where a template image is created using the first image when the first image is a zoomed image, and a template image is generated using the second image when the first image is a non-zoomed image. In this case, it is assumed that a magnification of the second image is higher than a magnification of the first non-zoomed image.

In FIG. 10, the second template image G12 shown in part (b) of FIG. 10 and the area R1 of the sub-camera image of part (d) of FIG. 10 show examples determined as having the highest degree of agreement, and the area R1 becomes the correspondence detection area. In addition, since the technique for template matching is a known technique, description thereof will be omitted.

<Second Method>

The second method is to decide the area by performing object recognition on the first image obtained by the main camera MC and the second image obtained by the sub-camera SC. Object candidate areas in the first and second images are decided using, for example, pattern recognition, to specify the largest object area out of the object candidate areas, and a correspondence detection area is decided based on a size of the object area. It should be noted that the largest object area can be specified out of the object candidate areas by calculating a total number of pixels with respect to each object area within each image and performing comparison among the object areas.

Figure 12:
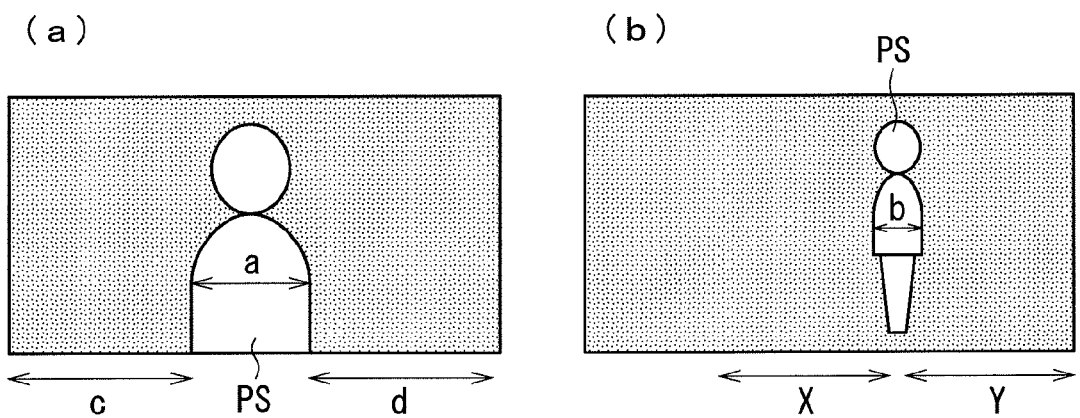
FIGS. 12 to 13 are views describing a second method for deciding a correspondence detection area.

FIG. 12 is a view showing an object specified by object recognition where part (a) of FIG. 12 shows an image of the photographic subject PS in the first image obtained by the main camera MC, and part (*b*) of FIG. 12 shows an image of the photographic subject PS in the second image obtained by the sub-camera SC. Further, in the first image shown in part (*a*) of FIG. 12, a width of the largest portion of the photographic subject PS is indicated as "a", and widths of areas outside both side surfaces of the photographic subject PS are indicated as "c" and "d". Moreover, in the second image shown in part (*b*) of FIG. 12, a width of the largest portion of the photographic subject PS is indicated as "b", and based on a ratio between this dimension and a dimension of the width a in the first image, the outer edges of the correspondence detection area, that is widths X and Y of the areas outside both side surfaces of the photographic subject PS, are decided.

That is, X (=bc/a) is decided from the relation a:b=c:X, and Y (=bd/a) is decided from the relation a:b=d:Y.

Figure 13:
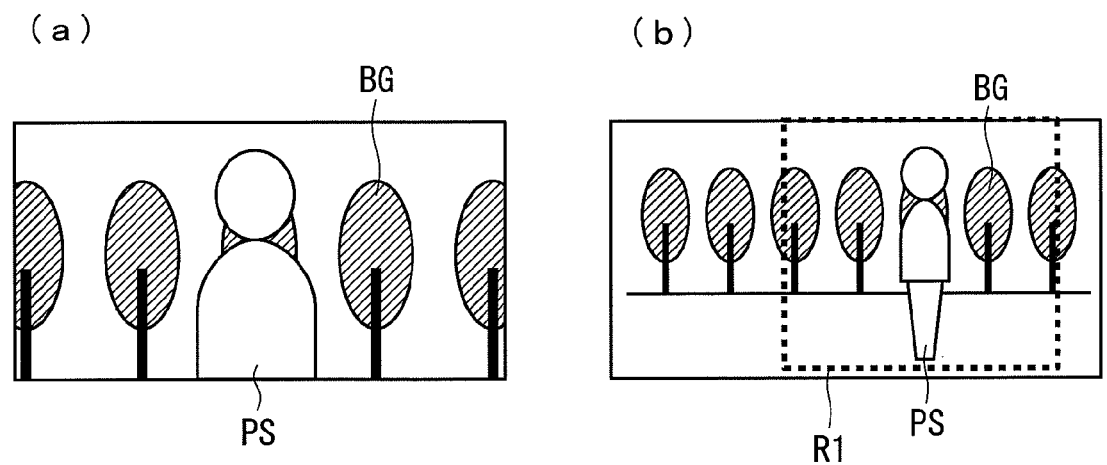

FIG. 13 is the correspondence detection area decided in such a manner. That is, part (*a*) of FIG. 13 shows the first image obtained by the main camera MC, part (*b*) of FIG. 13 shows the second image obtained by the sub-camera SC, and the area R1 surrounded by a broken line in the second image is the correspondence detection area.

It is to be noted that the outer edge of the correspondence detection area can be decided only in a parallax direction in the foregoing method, the examples shown in FIGS. 12 and 13 are examples in the case of using the stereo camera VC1 in the horizontally placed manner, and in the case of using it in the horizontally placed manner, the horizontal outer edge of the correspondence detection area can be decided, but its vertical outer edge is defined by the outer edge of the image. Similarly, in the case of using the stereo camera VC1 in the vertically placed manner, the vertical outer edge of the correspondence detection area can be decided, but its horizontal outer edge is defined by the outer edge of the image.

<Third Method>

The third method is to decide the area by the template matching of the first method by use of an object area specified by the object recognition described in the second method as a template.

In this case, with the template limited to the object area, a size of the template becomes smaller. Thus there is a possibility that the time required for matching can be reduced.

In addition, this is the same as the first method in that the template image is created using the first image when the first image is a zoomed image and the template image is created using the second image when the first image is a non-zoomed image.

<Fourth Method>

The fourth method is to decide the correspondence detection area by converting the first image obtained by the main camera MC and the second image obtained by the sub-camera SC such that the other image agrees with an optical axial center of one image, thereafter converting one image to such an image size so as to fit with an imaging device of the camera having photographed the other image, and superimposing the images.

FIG. 14 shows a conceptual diagram of the fourth method. Part (*a*) of FIG. 14 shows respective angles of view of the main camera MC and the sub-camera SC by lines LM and LS, and also shows a first image G1 and a second image G2 respectively acquired by the main camera MC and the sub-camera SC. It is to be noted that an optical axial center shown in the second image G2 represents an optical axial center OL of the first image. In addition, although the optical axial center is indicated by a line in the figure for a descriptive purpose, it is actually a point.

Part (*b*) of FIG. 14 shows a diagram where the optical axial center OL of the first image shown on the second image G2 obtained by the sub-camera SC is aligned with the optical axial center of the first image G1 obtained by the main camera MC. It should be noted that the method for obtaining the optical axial center OL of the first image on the second image G2 is obtained by calibration. That is, where the optical axial center of the first image G1 is placed on the second image G2 is unambiguously decided by calibration in shipment of the product. Therefore, when there is information thereof, the optical axis center OL of the first image on the second image G2 is obtained with ease. It is to be noted that an epipolar line that will be described later using FIG. 18 can also be unambiguously decided.

FIG. 15 shows a conceptual view of processing of aligning the optical axis center OL of the first image shown on the second image with the optical axial center of the first image G1, and thereafter converting one image to such an image size as to fit with an imaging device of the other image, and superimposing the images.

Part (*a*) of FIG. 15 shows the first image G1, part (*b*) of FIG. 15 shows the image obtained by converting the second image G2 to the image size fitted with the imaging device of the first image G1, and the superimposed area obtained by superimposing both images is regarded as the correspondence detection area R1.

Then, the image is normalized after the conversion to the fitted size of the imaging device. For example, since the size of the imaging device is held as known camera information and the photographing angle of view is acquired as photographing information, an angle of view per pixel can be figured out. That is, it is possible to change the size of the second image obtained by the sub-camera SC to the size of the first image obtained by the main camera MC For example, when the image size of the second image obtained by the sub-camera SC is 1000×1000 (pixels) and the horizontal angle of view is 100 degrees (the vertical one is also the same), if a pixel disposed interval (pixel pitch) of the imaging device is 0.1, photographing is performed up to the horizontal angle of view of 100 degrees by use of the imaging device of 100×100 (pixels).

Further, when the image size of the first image obtained by the main camera MC is 1000×1000 (pixels) and the horizontal angle of view is 50 degrees (the vertical one is also the same), if the pixel pitch of the imaging device is 0.2, photographing is performed up to the horizontal angle of view of 50 degrees by use of the imaging device of 200×200 (pixels).

When the size of the second image is fitted with the size of the first image in this condition, photographing is performed up to the horizontal angle of view of 100 degrees by use of the imaging device of virtual 400×400 (pixels), to give an image with 2000×2000 (pixels). This is image normalization.

It is to be noted that the foregoing fourth method is an effective method in the case of using the stereo camera VC1 in the horizontally placed manner.

<Fifth Method>

The fifth method is to decide the correspondence detection areas by limiting areas by ratios of the vertical angles of view with respect to the first image obtained by the main camera MC and the second image obtained by the sub-camera SC.

FIG. 16 shows the respective vertical angles of view of the main camera MC and the sub-camera SC by the lines LM and LS. As shown in FIG. 16, a ratio of a distance S1 from the optical axial center OL to the line LM and a distance S2 between the line LM and the line LS at a position relatively near the stereo camera VS1 is the same as a ratio of a distance S11 from the optical axial center OL to the line LM and a distance S12 between the line LM and the line LS at a position relatively distant from the stereo camera VS1.

As thus described, the correspondence detection area is limited with respect to the first and second images through use of the fact that the ratio of the angle of view in accordance with the distance from the camera is the same in terms of the vertical angle of view.

FIG. 17 is a conceptual diagram that limits an area with a ratio of the angle of view and part (a) of FIG. 17 shows a vertical position of the optical axial center OL with respect to the first image G1. A ratio of upper and lower portions is calculated with respect to the vertical position of the optical axial center OL, and a vertical area of the second image G2 is limited so as to have the same ratio as the above ratio, thereby limiting the area R1 shown in part (b) of FIG. 17. This area R1 becomes as the correspondence detection area.

It is to be noted that the vertical position of the optical axial center OL is unambiguously decided due to being the center of the vertical angle of view.

<Sixth Method>

The sixth method is to decide the correspondence detection area through use of an epipolar line. That is, when a feature point in one three-dimensional space is photographed by two cameras, that point, the centers of lenses of the two cameras and projections of the feature point on two image planes (image planes) obtained by the respective cameras are present on one plane. This plane is referred to as an epipolar plane, and an intersection between the epipolar plane and each image is referred to as an epipolar line. In each image, a point at which the epipolar line is intersected is referred to as an epipole.

Herein, in the case where the two cameras have already been calibrated and a mutual geometric relation is known, when one point is given in one image, an epipolar plane and an epipolar line on the image are decided, whereby a corresponding point is limited on an epipolar line on the other image even if an original feature point is not known. Accordingly, a corresponding point may be detected by performing one-dimensional detection along the epipolar line.

Figure 18:
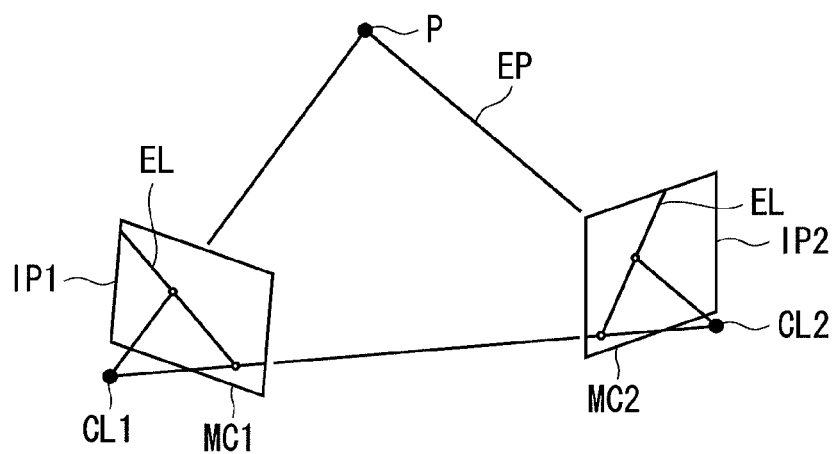
FIG. 18 is a view describing a sixth method for deciding a correspondence detection area.

FIG. 18 shows an epipolar plane EP defined by lens centers CL1 and CL2 of the two cameras and a feature point P, and two image planes IP1 and IP2 obtained by the respective cameras. Diagonal lines shown on the image planes IP1 and IP2 are epipolar lines EL, and two points shown on the epipolar line EL are epipoles.

As thus described, the one-dimensional area along the epipolar line is regarded as the correspondence detection area, whereby it is possible to limit the correspondence detection area as compared with the case of regarding a two-dimensional plane as the correspondence detection area, so as to promote the efficiency in correspondence detection.

Modified Example

In the first to sixth methods as thus described, it is appropriately decided as to which is used as the main image out of the first image obtained by the main camera MC and the second image obtained by the sub-camera SC, and either the case of the main image being the first image and the case of the main image being the second image can be applied.

As a method for appropriate determination, one with a larger number of pixels in the correspondence detection may be regarded as the main image, or one with a wider angle of view in the acquired image may be regarded as the main image.

<Correspondence Detection Processing>

Next, the correspondence detection will be described using FIGS. 19 to 23.

In correspondence detection processing, the point is obtained by making a detection for a point (corresponding point) on a reference image which corresponds to an arbitrary attention point on a base image. It is to be noted that the reference image is an image corresponding to the base image. Specifically, in stereo images, out of a pair of images picked up at the same time, one is the base image and the other is the reference image. Further, in the time-series images, out of images photographed by the same camera, a temporally earlier image is the base image and a temporally later image is the reference image. A template is set with respect to an attention point on this base image, a window on the reference image which corresponds to this template is detected, to obtain the corresponding point from this detected window.

Figure 19:
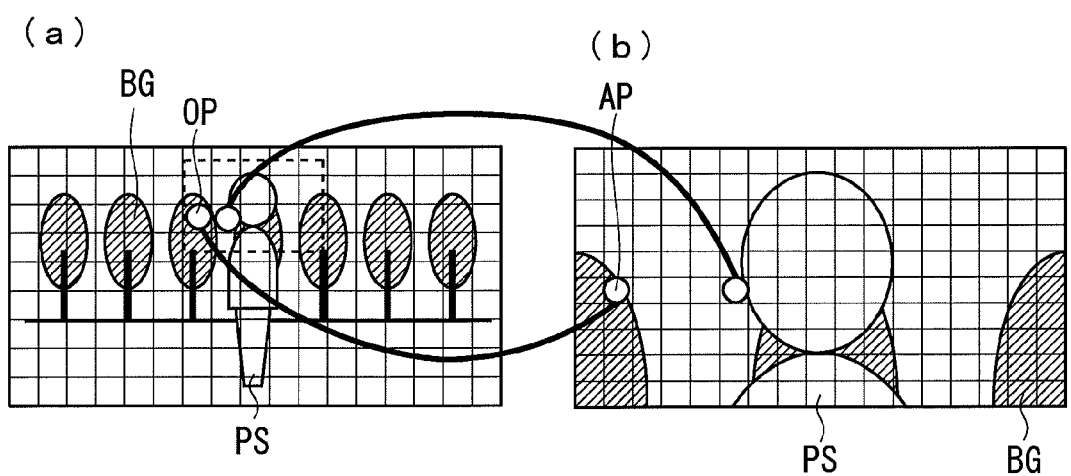
FIG. 19 is a conceptual view describing correspondence detection processing.

FIG. 19 is a conceptual view describing correspondence detection processing. Part (a) of FIG. 19 shows the second image obtained by the sub-camera SC as the base image, and part (b) of FIG. 19 shows the first image obtained by the main camera MC as the reference image. In FIG. 19, the attention point is indicated by OP and the corresponding point is indicated by AP.

As described above, in the correspondence detection processing by use of a correlation method, processing of sampling each one pixel on the reference image is performed in order to obtain the corresponding point on the reference image with respect to the attention point on the base image, but in the case of the base image having a low magnification and the reference image having a high magnification as in the present application, sampling intervals significantly differ, and information of the reference image is dropped out, making it difficult to acquire accurate distance information. Thereat, adopting first to fourth methods that will be described below allow acquisition of accurate distance information.

<First Method>

The first method is to set a base position on the base image to a sub pixel having a smaller size than the pixel size, to obtain the corresponding point on the reference image which corresponds thereto.

Figure 20:
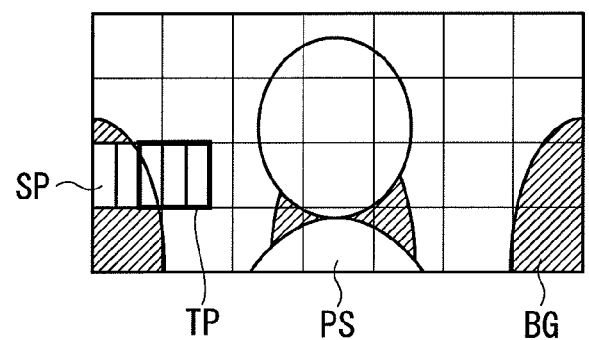
FIG. 20 is a view describing a first method for correspondence detection.

FIG. 20 is a view schematically showing an example of setting a sub pixel on the base image, and although this figure shows an example of horizontally dividing one pixel into three parts to set three sub-pixels, division of the pixel is not limited to this, and it can further be divided. It is thereby possible to make the sampling intervals uniform even in the case of the base image and the reference image having different magnifications.

In the case of using the sub-pixel, a template for detection is set which is almost the same as the window having hitherto been used for detecting the corresponding point.

That is, the corresponding point is detected by cutting out respective certain ranges of areas in the mutually corresponding images and taking a correlation value between the areas, and this area is referred to as a window. In the conventional manner, the window as this area is generated by units of pixels, and it is not that part of pixels are included in the window and the others are not included therein. However, in the template for detection, a position of the gravity center is the attention point as a position on the sub-pixel level, and hence the area is not necessarily an area by units of pixels. FIG. 20 shows an example of setting a template for detection TP with the sub-pixel SP as the attention point placed at the center when the attention point is on the position of the sub-pixel level.

It is to be noted that as a sub-pixel estimating method, Japanese Patent Application Laid-Open No. 2001-195597 discloses a method where, after calculation of a correlation value between images, correlation values among pixels are applied to a linear expression or a curved expression for interpolation from a positional relation of a position of the highest correlation value and correlation values of its vicinity, to estimate a peak position and a peak value of the correlation values.

<Second Method>

The second method is to compare the numbers of pixels inside the correspondence detection areas with respect to the first image obtained by the main camera MC and the second image obtained by the sub-camera SC, to regard the one with a larger number of pixels as the base image.

Figure 21:
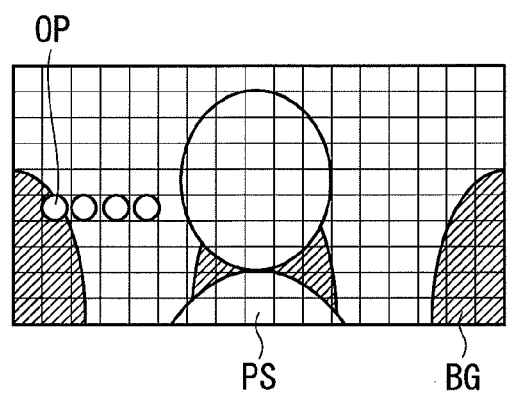
FIG. 21 is a view describing a second method for correspondence detection.

FIG. 21 shows an example of regarding one with a larger number of pixels as the base image, as well as showing an example of being able to increase attention points OP due to the large number of pixels.

<Third Method>

The third method is to roughly set an interval for correspondence detection at the time of default, and change a sampling interval of the corresponding points so as to change the interval for correspondence detection in accordance with a zooming degree in the case of acquiring information that zoom photographing has been performed. This is because correspondence detection needs to be performed with smaller intervals when the magnification of the lens is increased by zooming and the correspondence detection area becomes smaller.

Adopting such a method allows reduction in the time spent for correspondence detection in the case of not using zooming.

<Fourth Method>

The fourth method is to compare the numbers of pixels inside the correspondence detection areas with respect to the first image obtained by the main camera MC and the second image obtained by the sub-camera SC, to set the sampling interval in accordance with the one with a smaller number of pixels.

Figure 22:
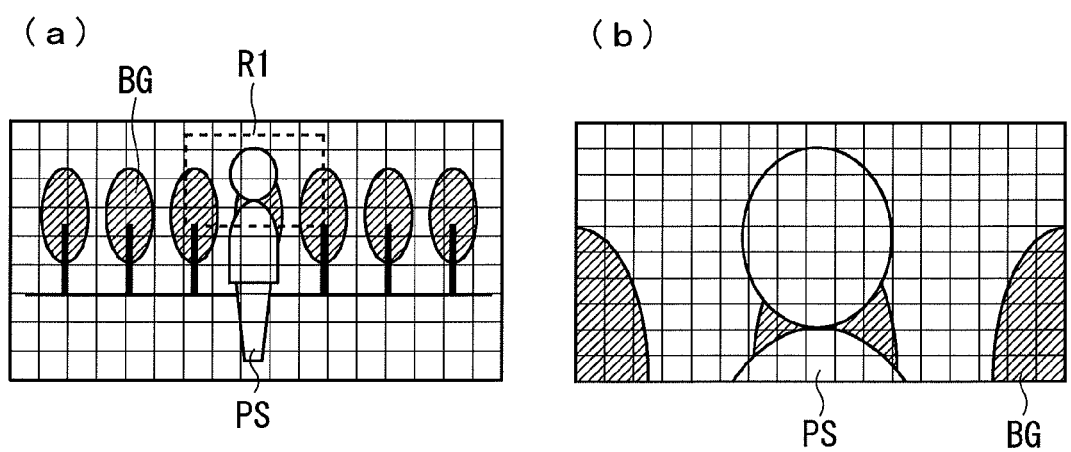
FIGS. 22 to 23 are views describing a third method for correspondence detection.

Part (a) of FIG. 22 shows the second image obtained by the sub-camera SC, and part (b) of FIG. 22 shows the first image obtained by the main camera MC.

In the second image, the area R1 surrounded by a broken line is the correspondence detection area, and it is the whole of the first image that corresponds to this.

As thus described, the zoomed first image has a larger number of pixels inside the correspondence detection area, while the second image has a smaller number of pixels inside the correspondence detection area. Thereat, as shown in FIG. 23, the sampling interval is adjusted.

Figure 23:
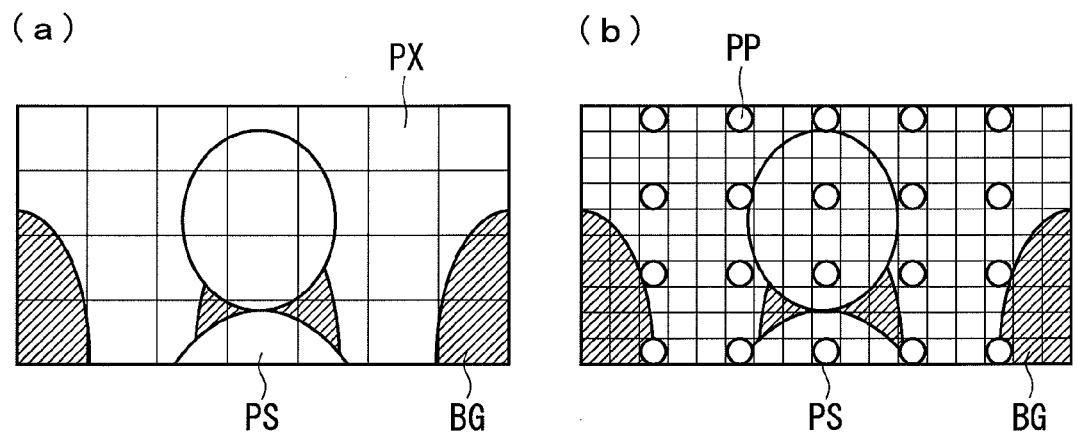

Part (a) of FIG. 23 shows the correspondence detection area R1 in an enlarged manner for comparison, and also shows each single pixel PX in a large scale.

Part (b) of FIG. 23 shows the first image obtained by the main camera MC where a sampling point PP is not provided in each pixel, but is provided in every third pixel. It is to be noted that setting of the sampling point PP may be set based on information of a zoom magnification as camera information.

In addition, although information slightly drops out when the sampling interval is set in accordance with the one with a smaller number of pixels, but setting the sampling interval so as not to be too wide can hold the accuracy in distance information to not lower than a certain level.

Modified Example

When a variable-power lens such as a fovea lens, a fish-eye lens or an anamorphic lens is used for the lens of the sub-camera SC as described above, there may be an extremely large difference in size of the correspondence detection area between the first image obtained by the main camera MC and the second image obtained by the sub-camera SC.

In such a case, when a window for use in correspondence detection is applied to an object surface, an aspect ratio of the window may be set such that the aspect ratio of the object surface is isotropic, to perform correspondence detection. This can prevent deterioration in accuracy of association in correspondence detection.

In the correspondence detection processing by use of the correlation method, correlations value (degrees of similarity) of a plurality of windows set in the reference image corresponding to the base image is calculated, and it is determined whether or not the template and the window corresponds to each other based on the correlation value.

Herein, as specific calculating method for a correlation value, there are known, for example, an SAD (Sum of Absolute Difference) method, an SSD (Sum of Squared Difference) method, an NCC (Normalize cross Correlation) method, and the like.

The SAD method is a method using a function for obtaining a total sum of absolute values of brightness values of the template and the window, and a correlation value of the template and each window is obtained using this function. Further, there is also a correlation value calculating method having robustness as compared with the above SAD method. Specifically, this method is a method for calculating a similarity from a frequency decomposition signal of an image pattern by means of a signal of only a phase component with an amplitude component suppressed. The use of this method can realize calculation of the correlation value having robustness which is resistant to influences of a difference in photographing condition between the right/left cameras in the stereo image, noise, and the like.

It is to be noted that as the method for calculating a frequency decomposition signal of an image pattern, there are known, for example, fast Fourier transform (FFT), discrete Fourier transform (DFT), discrete cosine transform (DCT), wavelet transform, Hadamard transform, and the like. As the method for calculating the correlation value having robustness as thus described, a Phase-Only Correlation (POC) method can be used.

Also in the POC method, a template is set on the base image, and a window having the same size is set on the reference image. Then, a correlation value (POC value) between the template and each window is calculated, to obtain a window corresponding to the template from the correlation value. First, the template of the base image and the window of the reference image are respectively subjected to two-dimensional discrete Fourier transform, to be standardized, and then synthesized to be subjected to a two-dimensional inverse discrete Fourier transform. In this manner, the POC value as the correlation value is obtained. Further, since the POC value is discretely obtained with respect to each pixel inside the window, the correlation value with respect to each pixel can be obtained. In this respect, the method is different from the foregoing SAD method and the like for obtaining the correlation value with respect to each window. As thus described, in the POC method, the correlation value can be obtained with respect to each pixel inside the window, and hence it is possible to perform correspondence detection less vulnerable to a brightness change by use of phase information inside a set range of the window. On the other hand, since brightness information is used in the SAD method, the method is suitable for such a case as the base image and the reference image having different image sizes as in the present application.

<Acquisition of Distance Information>

It is possible to obtain parallax information from the relation between the attention point and the corresponding point which was obtained by the foregoing correspondence detection, and to acquire distance information from the parallax information.

In the present invention, there are cases where the stereo camera SV1 is used in the vertically placed manner as described using FIG. 4.

When parallax information is about a horizontal parallax, distance information can be calculated with ease, but when it is about a vertical parallax, it is necessary to change it to a horizontal parallax by a three-dimensional reconstruction. Hereinafter, this processing will be described using FIG. 24.

Figure 24:
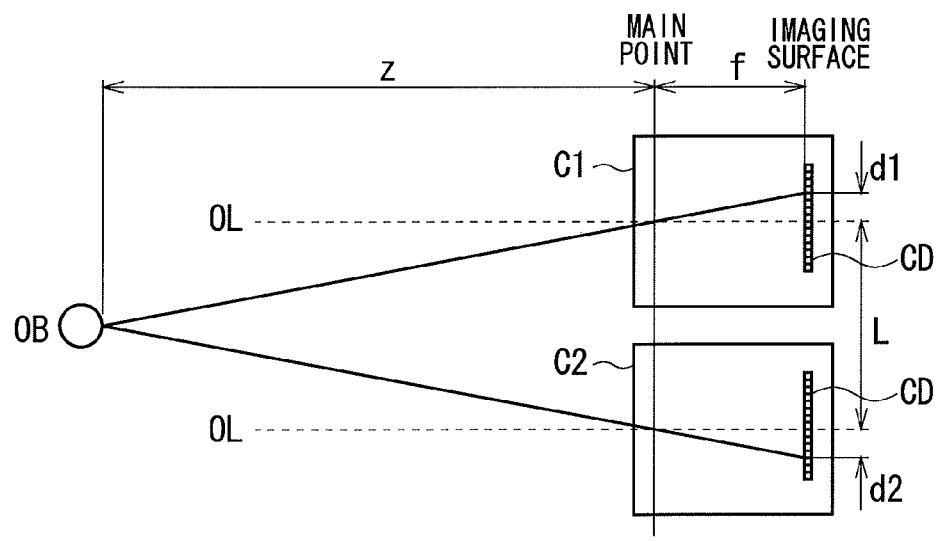
FIG. 24 is a view describing a three-dimensional reconstruction.

In FIG. 24, two cameras C1 and C2 are vertically disposed so as to have a base-line length L, and that focal distances f, the number of pixels in imaging devices CD and sizes μ of one pixel of the two cameras are the same. Further, a parallax (number of displaced pixels) on the imaging surface is d (=d1+d2).

A distance Z to an object OB at this time is obtained by the Mathematical Expression (2) below:

[Mathematical Expression 2]

$$Z = \frac{Lf}{\mu d} \quad (2)$$

Further, a three-dimensional position (X, Y, Z) is calculated by Mathematical Expressions (3) and (4) below: It is noted that this is a position where the object is projected on the imaging device CD of the camera C1 on the basis of (x, y).

[Mathematical Expression 3]

$$X = \mu x \frac{Z}{f} \quad (3)$$

[Mathematical Expression 4]

$$Y = \mu y \frac{Z}{f} \quad (4)$$

Since the three-dimensional information obtained by these is based on vertical parallax information, it is transformed to horizontal parallax information. Since conversion to horizontal parallax information is conversion to a pseudo viewpoint position, it can be treated as a paralleled state, and Mathematical Expression (2) may be transformed to one like Mathematical Expression (5):

[Mathematical Expression 5]

$$d = \frac{Lf}{\mu Z} \quad (5)$$

It should be noted that in the present invention, there are differences in focal distance f, the number of pixels in the imaging device CD and size μ of one pixel between the cameras C1 and C2, thereby necessitating parallelization processing before processing of Mathematical Expressions (2) to (4). In addition, the three-dimensional reconstruction and the parallelization processing are general techniques and, for example, described in "Study on extraction of movement trajectory of people in indoor mixed circumstance by means of stereo camera", written by Kosuke Kondoh, Department of Information and Communication, Faculty of Science and Engineering at Waseda University, Graduation Thesis for 2005.

<Generation of Right/Left Images>

Next, there will be described a method for obtaining stereo view images in the right/left image generating part 4 based on the distance information obtained by the distance information acquiring part 3 and the main image obtained by the main image acquiring part 2.

Figure 25:
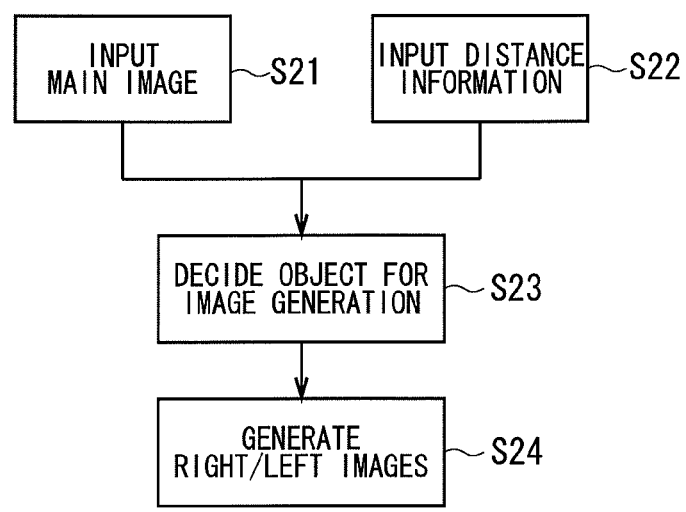
FIG. 25 is a flowchart describing a procedure for generating right/left images.

FIG. 25 is a flowchart describing a procedure for generating right/left images in the right/left image generating part 4.

As shown in FIG. 25, when the main image and the distance information are respectively inputted in Steps S21 and S22, first, an object for image generation is decided in Step S23.

Next, right/left images are generated in Step S24. As for generation of the right/left images, first to fourth methods described below can be adopted.

<First Method>

The first method is to generate, from the second image obtained by the sub-camera SC, a new second image as high a definition as the first image based on distance information.

FIG. 26 is a view conceptually showing the first method. Part (a) and part (b) of FIG. 26 respectively show the first image obtained by the main camera MC and the second image obtained by the sub-camera SC.

In this example, the first image is regarded as the main image and distance information is acquired from the second image, and part (c) and part (d) of FIG. 26 respectively schematically show the main image and an area where the distance information has been obtained.

Herein, since the distance information is parallax information, the second image is displaced in accordance with a parallax value, to generate the new second image. In the first method, attention is focused only on a stereoscopically viewable area (area where a corresponding point has been obtained and parallax information has been obtained), and the right/left images are configured only in that area. That is, as shown in part (d) of FIG. 26, out of the second image, attention is focused only on the area where distance information (parallax information) has been obtained, and an image in that area is displaced in accordance with a parallax value. At this time, since there are a small number of pixels in the area in the second image, pixels are compensated from the corresponding first image, thereby to obtain the new second image having a resolution of the same level as that of the first image.

Part (e) of FIG. 26 shows the first image and part (f) of FIG. 26 shows the new second image. In the new second image, a position of the photographic subject PS is displaced in accordance with the parallax value, and it is possible to obtain stereo view images from the first image and the new second image. It is to be noted that in this method, since the new second image with a high resolution is generated, it is possible to obtain a high-definition image.

The foregoing first image will be more clearly described using FIGS. 27 and 28. FIG. 27 is a view showing the first and second images in the case of not performing processing for obtaining stereo view images where part (a) of FIG. 27 shows a first main camera image, part (b) of FIG. 27 shows a second main camera image and part (c) of FIG. 27 shows a third main camera image which were photographed by the main camera MC. These main camera images are images with different magnifications. Further, part (d), part (e) and part (f) of FIG. 27 respectively show images obtained by the sub-camera SC at the time of acquiring the images of part (a) to part (c) of FIG. 27.

As thus described, in the case of not performing the processing for obtaining stereo view images, the first image and the second image are completely different images, and stereo view images cannot be obtained from both images.

On the other hand, FIG. 28 shows the first and second images in the case of applying the first method in order to obtain stereo view images.

Part (a) of FIG. 28 shows a first main camera image, part (b) of FIG. 28 shows a second main camera image and part (c) of FIG. 28 shows a third main camera image which were photographed by the main camera MC, and while these main camera images are images with different magnifications, the second images respectively corresponding to these are also images with different magnifications.

That is, part (d) to part (f) of FIG. 28 show new second images obtained by means of the foregoing first method, and the respective new second images are images including displacements corresponding to parallaxes with respect to the first images.

As thus described, the second image obtained by the sub-camera SC having a resolution and the like which are inherently inferior to those of the main camera MC, becomes a high-resolution image of the same level as the first image and both images are used as stereo view images, whereby it is possible to make a three-dimensional display free from incompatibility.

Modified Example of First Method

Although the above-described first method has been a method to configure stereo view images only in the stereoscopically viewable area, there may be adopted a method to regard the second image as the main image and generate stereo view images only in an area covered by the first image.

In this case, when the first image has a wider angle of view, an image obtained by displacing the first image in accordance with a parallax value is used as a new second image.

The foregoing modified example of the first method will be more clearly described using FIGS. 29 and 30. FIG. 29 is a view showing the first and second images in the case of not performing the processing for obtaining stereo view images and part (a) of FIG. 29 shows a first main camera image, part (b) of FIG. 29 shows a second main camera image and part (c) of FIG. 29 shows a third main camera image which were photographed by the main camera MC. These main camera images are images with different magnifications. Further, part (d), part (e) and part (f) of FIG. 29 respectively show images obtained by the sub-camera SC at the time of acquiring the images of part (a) to part (c) of FIG. 29.

As thus described, in the case of not performing the processing for obtaining stereo view images, the first image and the second image are completely different images, and stereo view images cannot be obtained from both images.

FIG. 30 shows the first and second images in the case of applying the modified example of the first method in order to obtain stereo view images.

Part (a) of FIG. 30 shows an image photographed by the main camera MC as the first image, and this is an image with the same angle of view as that of the second image photographed by the sub-camera SC as shown in part (d) of FIG. 29. Therefore in this case, the subject PS is displaced in the second image shown in part (d) of FIG. 29 just by a parallax value, thereby to generate a new first image shown in part (a) of FIG. 30. In part (d) of FIG. 30, a portion shown as an area R10 uses data of the second image shown in part (d) FIG. 29.

Further, in the image shown in part (e) of FIG. 30, data of the first image shown in part (b) of FIG. 29 is used in a portion shown as an area R11, and data of the second image is used in an area other than that. Then, the photographic subject PS is displaced in the image shown in part (e) of FIG. 30 just by a parallax value, thereby to generate a new first image shown in part (b) of FIG. 30.

Similarly, in the image shown in part (f) of FIG. 30, data of the first image shown in part (c) of FIG. 29 is used in a portion shown as an area R12, and data of the second image is used in an area other than that. Then, the photographic subject PS is displaced in the image shown in part (f) of FIG. 30 just by a parallax value, thereby to generate a new first image shown in part (b) of FIG. 30.

As thus described, according to the modified example of the first method, the second image is used as the main image, and when the first image has a wider angle of view (part (a) of FIG. 29), the stereo view image is an area the whole of which can be three dimensionally displayed as in part (d) of FIG. 30, or an image where only a portion covered by the first image can be three-dimensionally displayed. For this reason, it is possible to enhance the accuracy of the three-dimensionally displayable area.

Figure 31:
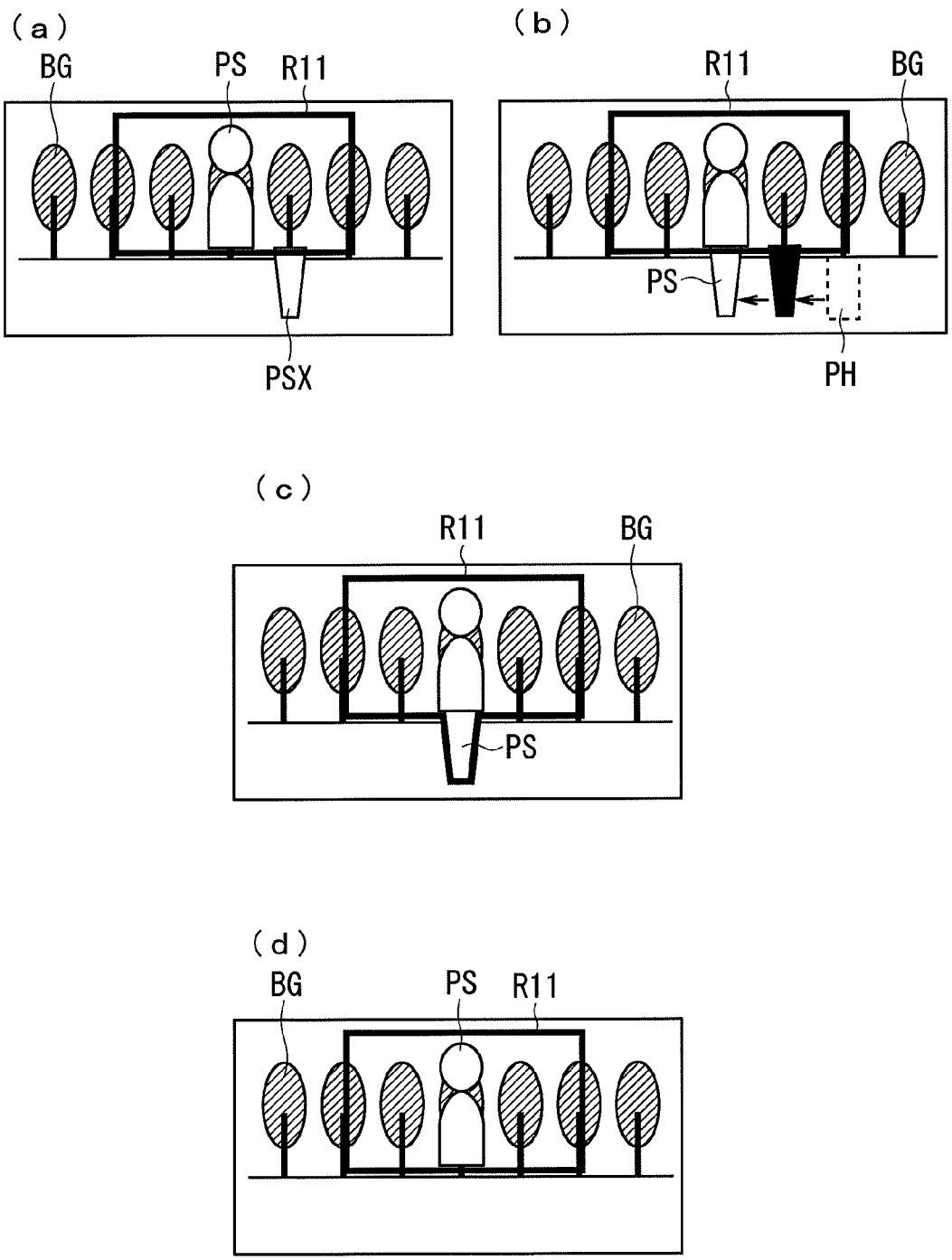
FIG. 31 is a view describing a method for solving a problem at the time of generating a new first image.

However, in practice, even when the new first image shown in part (b) of FIG. 30 is intended to be generated, an image as shown in part (a) of FIG. 31 is undesirably obtained. This is because only the image of the area R11 uses data of the first image shown in part (b) of FIG. 29.

In such a case, when the image as shown in part (b) of FIG. 30 is to be obtained, as for an image PSX of the photographic subject PS not included in the area R11, for example, image information placed on the opposite side to the direction in which the area R11 is displaced may be copied like a mirror, to obtain a perfect photographic subject PS as shown in part (b) of FIG. 31. In this case, at the position where the image PSX has been placed, image information of a peripheral image PH placed further next thereto may be copied like a mirror. It is to be noted that, although image information may be moved in place of being copied, in that case, after movement of the peripheral image PH, a blank space is filled by performing such processing as to blur the image.

Further, by use of such a technique as the object recognition described in the setting processing for a correspondence detection area, the whole of the photographic subject PS is recognized as the object and processed so as to be included in the area R11 as shown in part (c) of FIG. 31, thereby allowing prevention of a part of the photographic subject PS from being separated off.

Moreover, as shown in part (a) of FIG. 31, when the image PSX of the photographic subject PS not included in the area R11 is separated off, the image PSX may be deleted. As a method for the deletion, image information placed on the opposite side to the direction in which the area R11 is displaced may be copied like a mirror, or the image information may be moved.

<Second Method>

The second method is to regard one image with a wider angle of view as the main image out of the first image obtained by the main camera MC and the second image obtained by the sub-camera SC, and embed only a stereoscopically viewable area into the main image.

FIG. 32 is a view conceptually showing the second method. Part (a) and part (b) of FIG. 32 respectively show the first image obtained by the main camera MC and the second image obtained by the sub-camera SC.

In this example, the second image with a wider angle of view is regarded as the main image and distance information is acquired from the first image, and part (d) of FIG. 32 schematically shows the main image and part (c) of FIG. 32 schematically shows an area where distance information has been obtained.

Embedding the first image into the second image generates a new first image. Part (e) of FIG. 32 shows the new first image as thus obtained. An area shown by an area R21 in part (e) of FIG. 32 is an area embedded with the first image shown in part (c) of FIG. 32 which corresponds to the image where the distance information has been obtained.

As thus described, in the second method, since embedding the stereoscopically viewable area into the main image with a wider angle of view generates the new first image, accurate stereoscopic viewing is possible only in an area shown by an area R22 in part (f) of FIG. 32.

Figure 33:
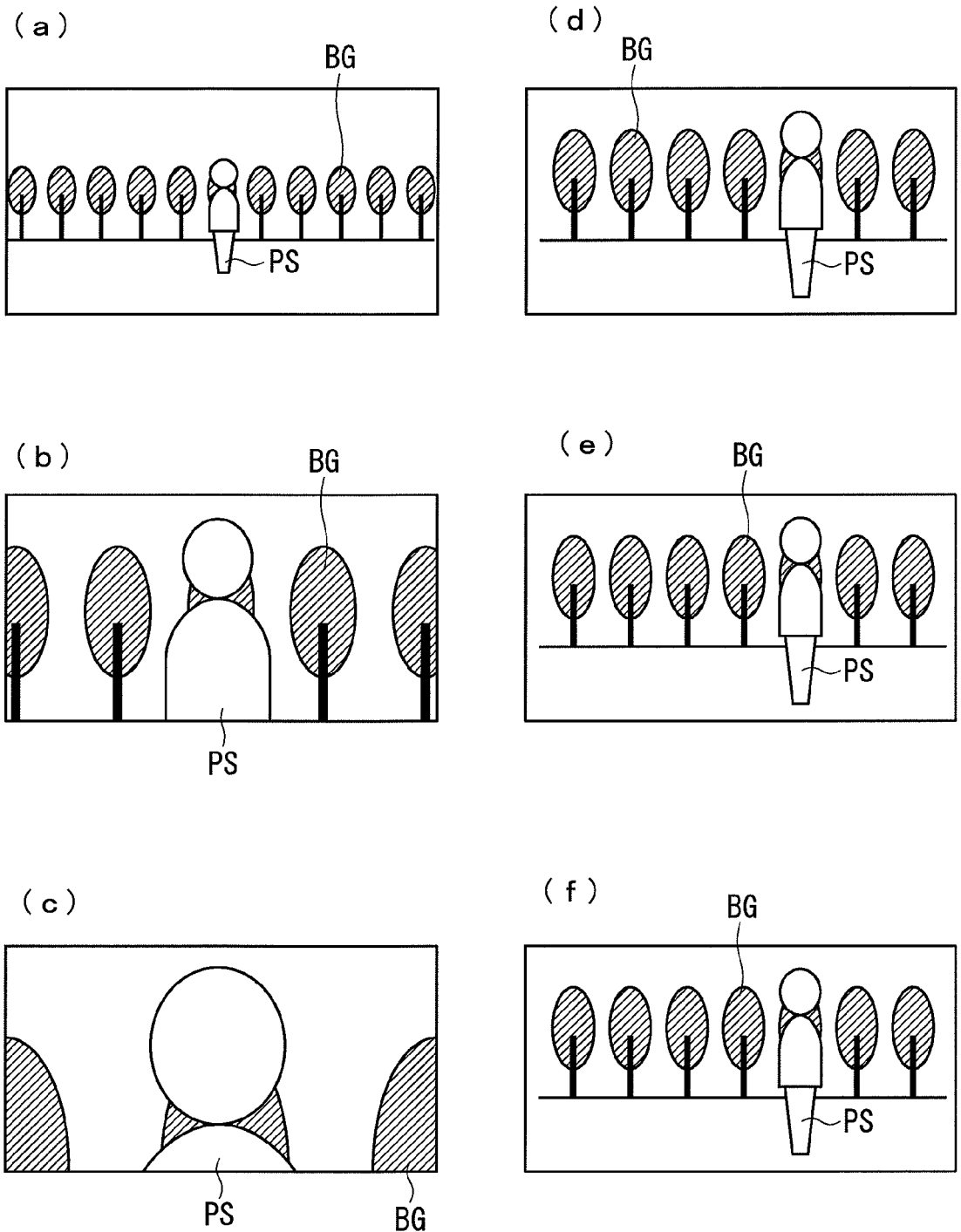
Figure 34:
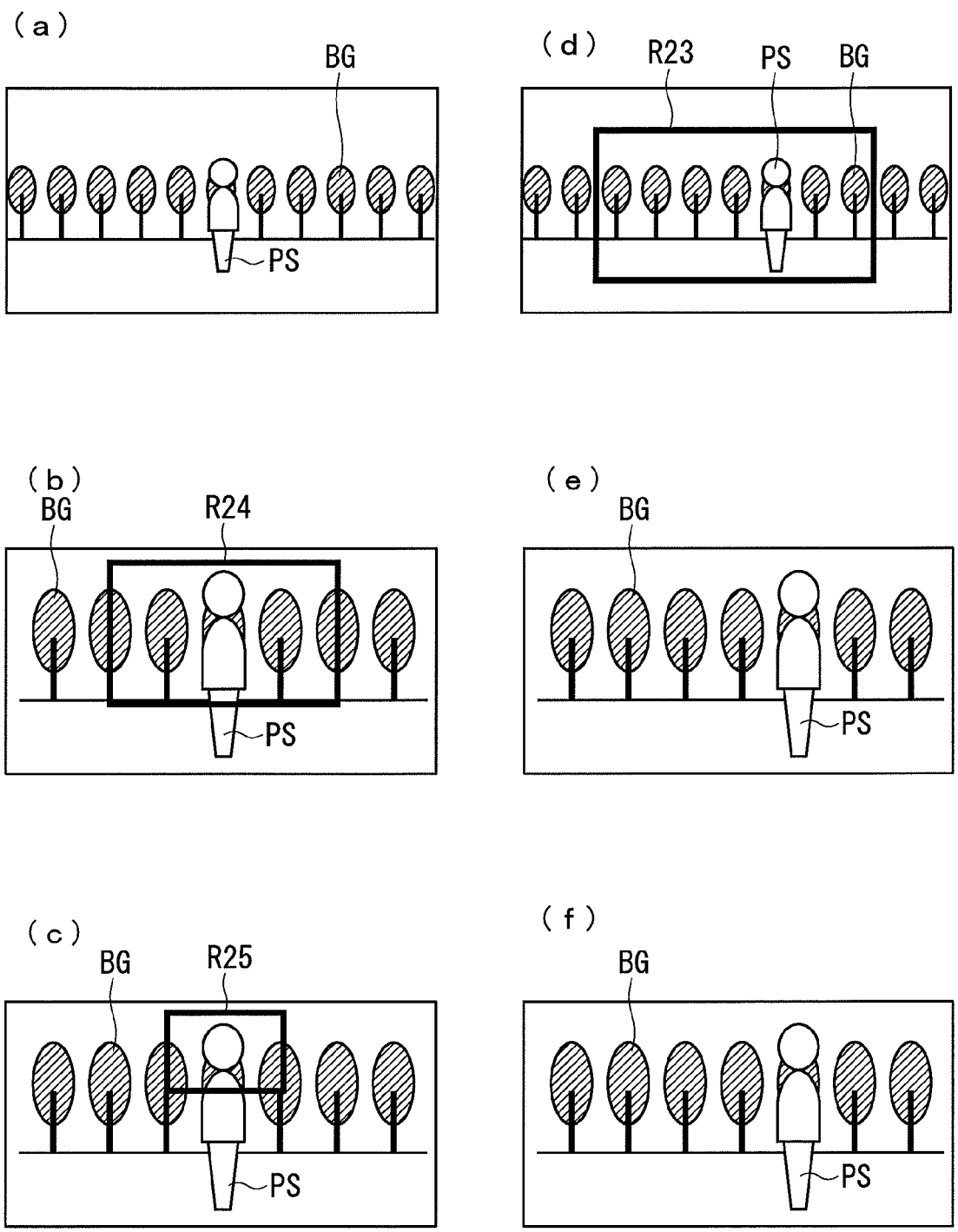

The foregoing second method will be more clearly described using FIGS. 33 and 34. FIG. 33 is a view showing the first and second images in the case of not performing the processing for obtaining stereo view images, and part (a) of FIG. 33 shows a first main camera image, part (b) of FIG. 33 shows a second main camera image and part (c) of FIG. 33 shows a third main camera image which were photographed by the main camera MC. These main camera images are images with different magnifications. Further, part (d), part (e) and part (f) of FIG. 33 respectively show images obtained by the sub-camera SC at the time of acquiring the images of part (a) to part (c) of FIG. 33.

As thus described, in the case of not performing the processing for obtaining stereo view images, the first image and the second image are completely different images, and stereo view images cannot be obtained from both images.

On the other hand, FIG. 34 shows the first and second images in the case of applying the second method in order to obtain stereo view images.

Part (a) of FIG. 34 shows an image photographed by the main camera MC as the first image, and this is an image with a wider angle of view than that of the second image photographed by the sub-camera SC as shown in part (d) of FIG. 33. Therefore, in this case, the first image is regarded as the main image and the second image is embedded into the first image, to generate a new second image shown in part (d) of FIG. 34. In the new second image shown in part (d) FIG. 34, an area R23 is the area embedded with the second image photographed by the sub-camera SC as shown in part (d) of FIG. 33, and a portion other than the area R23 is the area of the first image as the main image. In this case, the area R23 corresponds to the area where distance information has been obtained.

Further, since the second image photographed by the sub-camera SC as shown in part (e) of FIG. 33 has a wider angle of view than the first image photographed by the main camera MC as shown in part (b) of FIG. 33, in this case, the second image is regarded as the main image and the first image is embedded into the second image, to generate a new first image shown in part (b) of FIG. 34. In the new first image shown in part (b) of FIG. 34, an area R24 is the area embedded with the first image photographed by the main camera MC as shown in part (b) of FIG. 33, and a portion other than the area R24 is the area of the second image as the main image. In this case, the area R24 corresponds to the area where distance information has been obtained.

Similarly, since the second image photographed by the sub-camera SC shown in part (f) of FIG. 33 has a wider angle of view than the first image photographed by the main camera MC as shown in part (c) of FIG. 33, in this case, the second image is regarded as the main image and the first image is embedded into the second image, to generate a new first image shown in part (c) of FIG. 34. In the new first image shown in part (c) of FIG. 34, an area R25 is the area embedded with the first image photographed by the main camera MC as shown in part (c) of FIG. 33, and a portion other than the area R25 is the area of the second image as the main image. In this case, the area R25 corresponds to the area where distance information has been obtained.

It is to be noted that also in the foregoing second method, similarly to the first method, although only a part of the photographic subject PS may be separated off when the new first or second image is to be generated, this case can also be dealt with by copying or moving image information as described in the first method.

Modified Example 1 of Second Method

Although the above-described second method has been a method to regard one with a wider angle of view as the main image out of the first image obtained by the main camera MC and the second image obtained by the sub-camera SC and embed only the stereoscopically viewable area into the main image, there may be adopted a method for generating an image such that only the stereoscopically viewable area is configured as a three-dimensional image, and an area other than that displays pseudo three-dimensional data.

FIG. 35 is a view conceptually showing Modified Example 1 of the second method. Part (a) and (b) of FIG. 35 respectively show the first image obtained by the main camera MC and the second image obtained by the sub-camera SC.

In this example, the second image with a wider angle of view is regarded as the main image and distance information is acquired from the first image, and part (d) of FIG. 35 schematically shows the main image and part (c) of FIG. 35 schematically shows an area where distance information has been obtained.

Embedding the first image into the second image generates a new first image. Part (e) of FIG. 35 shows the new first image as thus obtained. An area shown by an area R31 in part (e) of FIG. 35 is the area embedded with the first image.

On the other hand, in part (f) of FIG. 35, an area where distance information has not been obtained is filled in and schematically shown. As thus described, in part (e) of FIG. 35, since distance information has not been obtained in an area other than the area indicated by the area R31, that portion may be displayed as the pseudo three-dimensional area.

This results in that the area shown in R32 like the second image shown in part (f) of FIG. 35 becomes a stereo-viewable area. It is to be noted that, since the area other than the area where distance information has actually been calculated has parallax information, in the case of generating stereo view images, it is necessary to displace the area other than the area where distance information has actually been calculated. In the case of regarding the second image as the main image and embedding the image into the first image, the image inside the area R31 is displaced just by a parallax and an area other than the area R31 is also displaced just by the parallax. In the example of part (g) of FIG. 35, the area is displaced in a left direction in the figure. This results in the presence of an area NR without effective data on the right end of the figure.

As thus described, an image is generated such that only the stereoscopically viewable area is configured as the three-dimensional image and an area other than that displays the pseudo three-dimensional image, thereby allowing expansion of the stereoscopically viewable area.

Herein, creation of pseudo three-dimensional data is disclosed, for example, in Japanese Patent Application Laid-Open No. 2005-151534. The document discloses a method for creating depth presumption data from a two-dimensional image not provided with distance information, to generate a pseudo three-dimensional image by use of this depth presumption data, and discloses creation of depth presumption data by use of a plurality of fundamental depth models showing depth values with respect to a plurality of scenes as fundamentals.

It is to be noted that the obtained distance information may be used for deciding an appropriate one out of the plurality of fundamental depth models (curved surface models) for generating the pseudo three-dimensional image.

Modified Example 2 of Second Method

Although the above-described second method has been a method to regard one with a wider angle of view as the main image out of the first image obtained by the main camera MC and the second image obtained by the sub-camera SC and embed the area where distance information has actually been acquired into the main image as the stereoscopically viewable area, there may be formed a configuration to provide pseudo parallax information to an area other than the area where distance information has actually been acquired.

Figure 36:
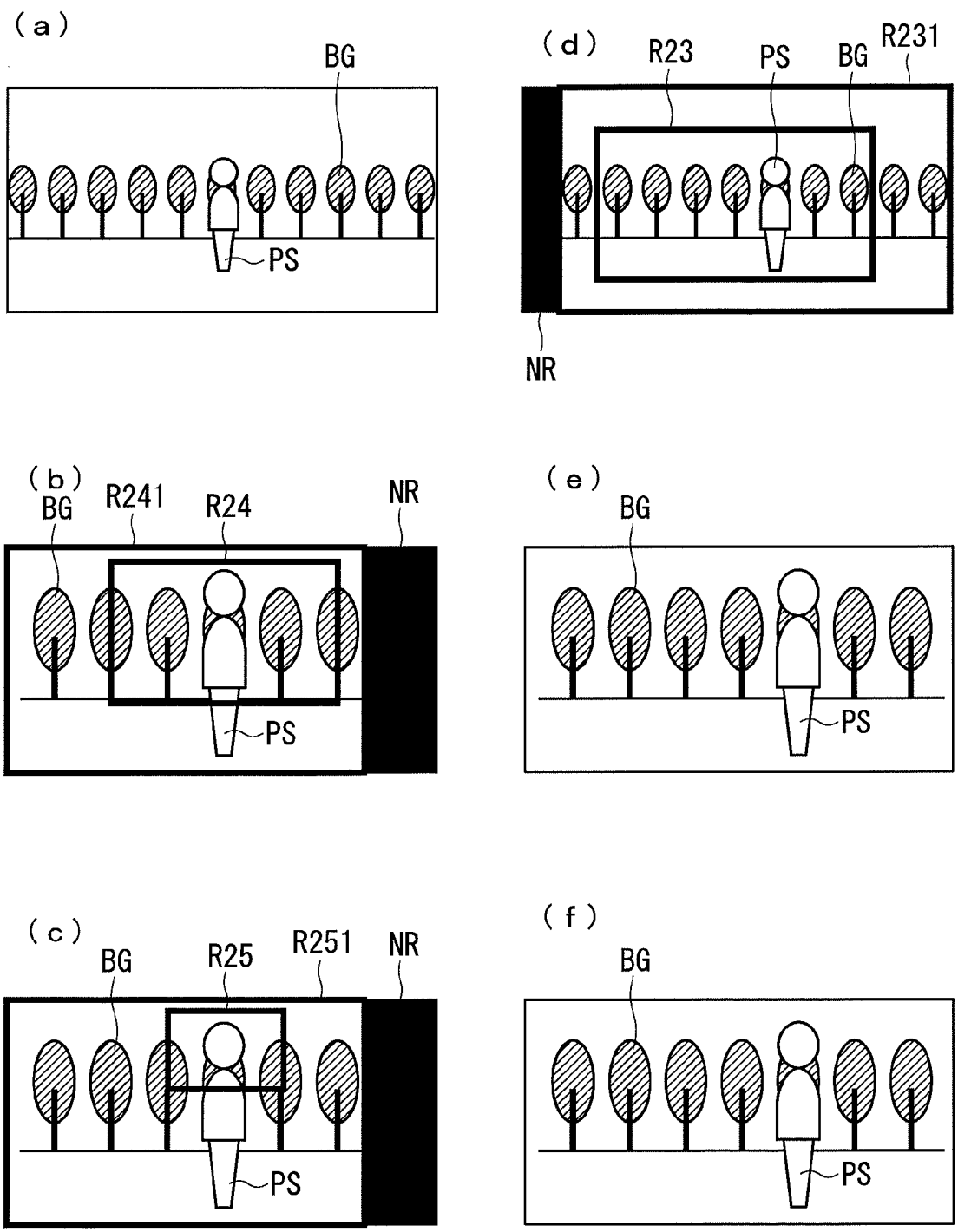
FIG. 36 is a view describing Modified Example 2 of the second method for generating right/left images.

FIG. 36 is a view conceptually showing Modified Example 2 of the second method. FIG. 36 shows the first and second images in the case of applying Modified Example 2 of the second method in order to obtain stereo view images.

Part (a) of FIG. 36 shows an image photographed by the main camera MC as the first image, and this is an image with a wider angle of view than that of the second image photographed by the sub-camera SC as shown in part (d) of FIG. 33. Therefore, in this case, the first image is regarded as the main image and the second image is embedded into the first image, to generate a new second image shown in part (d) of FIG. 36. In the new second image shown in part (d) of FIG. 36, the area R23 is the area embedded with the second image photographed by the sub-camera SC as shown in part (d) of FIG. 33, and a portion other than the area R23 is the area of the first image which is provided with pseudo parallax information. In this case, the area R23 is the area where distance information has actually been obtained, and the area other than this also has pseudo parallax information, resulting in that a portion shown by an area R231 is the stereo viewable area.

Further, since the second image photographed by the sub-camera SC as shown in part (e) of FIG. 33 has a wider angle of view than the first image photographed by the main camera MC as shown in part (b) of FIG. 33, in this case, the second image is regarded as the main image and the first image is embedded into the second image, to generate a new first image shown in part (b) of FIG. 36. In the new first image shown in part (b) of FIG. 36, the area R24 is the area embedded with the first image photographed by the main camera MC as shown in part (b) of FIG. 33, and a portion other than the area R24 is the area of the first image which is provided with pseudo parallax information. In this case, the area R24 is the area where distance information has actually been obtained, and the area other than this also has pseudo parallax information, resulting in that a portion shown by an area R241 is the stereo viewable area.

Similarly, since the second image photographed by the sub-camera SC as shown in part (f) of FIG. 33 has a wider angle of view than the first image photographed by the main camera MC as shown in part (c) of FIG. 33, in this case, the second image is regarded as the main image and the first image is embedded into the second image, to generate a new first image shown in part (c) of FIG. 36. In the new first image shown in part (c) of FIG. 36, the area R25 is the area embedded with the first image photographed by the main camera MC as shown in part (c) of FIG. 33, and a portion other than the area R25 is the area of the first image which is provided with pseudo parallax information. In this case, the area R25 is the area where distance information has actually been obtained, and the area other than this also has pseudo parallax information, resulting in that a portion shown by an area R251 is the stereo viewable area.

Herein, the pseudo parallax information may be provided as a fluctuation value that varies depending on the distance (the longer the distance, the smaller the provided parallax), or may be provided as a uniform fixed value regardless of the distance. However, in the case of the fixed value, providing a parallax value of such an object as to be placed ahead of a photographic subject generates an image with incompatibility when it is three-dimensionally displayed, and hence it is desirable to make the parallax value as small as possible.

Further, when an area other than the area where distance information has actually been calculated has parallax information, in the case of generating stereo view images, it is necessary to displace the area other than the area where distance information has actually been calculated.

For example, when the first image is regarded as the main image and the second image photographed by the sub-camera SC as shown in part (d) of FIG. 33 is embedded into the first image, to generate the new second image shown in part (d) of FIG. 36, the image inside the area R23 is displaced just by the parallax and the area other than the area R23 is also displaced just by the parallax. In the example of part (d) of FIG. 33, the area is displaced in a right direction in the figure. This results in the presence of an area NR without effective data on the left end of the figure.

For a similar reason, in the example of part (b) of FIG. 36, the area is displaced in the left direction in the figure. This results in the presence of an area NR without effective data on the right end of the figure.

In the example of part (c) of FIG. 36, the area is displaced in the left direction in the figure. This results in the presence of an area NR without effective data on the right end of the figure.

<Third Method>

The third method is to create pseudo three-dimensional data by use of acquired distance information as auxiliary data.

Figure 37:
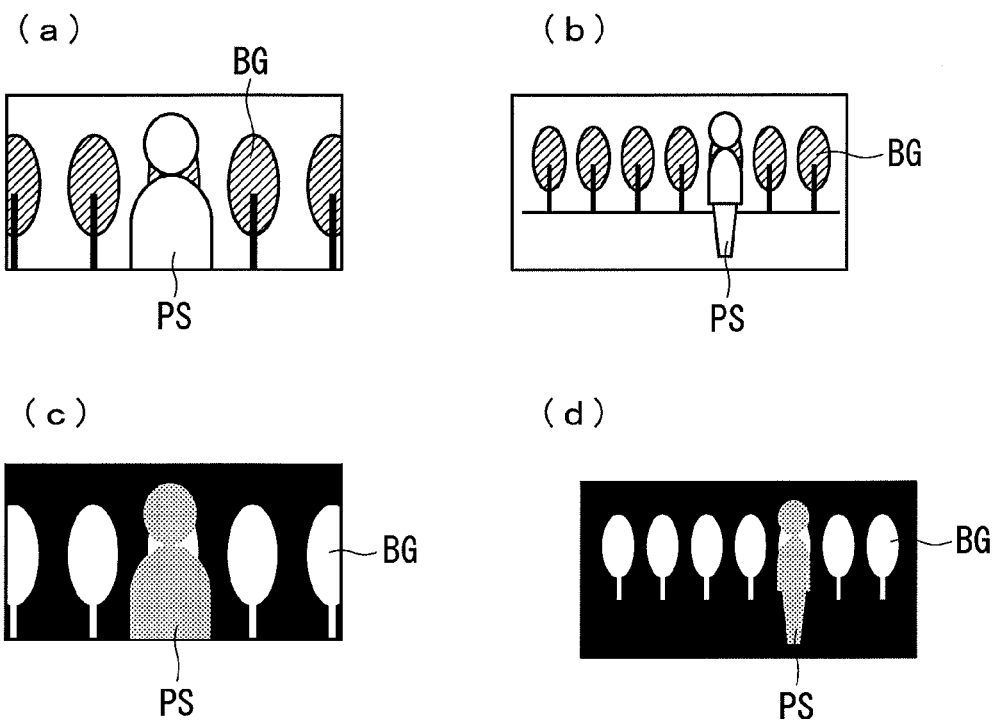
FIG. 37 is a view describing a third method for generating right/left images.

FIG. 37 is a view conceptually showing the third method. Part (a) and part (b) of FIG. 37 respectively show the first image obtained by the main camera MC and the second image obtained by the sub-camera SC.

In this example, the second image with a wider angle of view is regarded as the main image and distance information is acquired from the first image, and part (c) of FIG. 37 schematically shows the area where distance information has been obtained.

Part (d) of FIG. 37 schematically shows a new second image obtained by use of pseudo three-dimensional data created using this distance information as auxiliary data.

The use of the first image and the new second image made up of this pseudo three-dimensional data can generate a stereo-viewable image.

Herein, Although Japanese Patent Application Laid-Open No. 2005-151534 described above discloses a technique of previously preparing a depth model showing a depth value and creating depth presumption data by use of the model, adopting a method for creating pseudo three-dimensional data by use of acquired distance information as auxiliary data eliminates the need for previously preparing the depth model.

<Fourth Method>

The fourth method is to regard images as the right/left images for stereo viewing, the images being obtained by changing the base-line lengths in accordance with a zoom magnifications.

FIG. 38 is a diagram showing photographed images in the case of using the stereo camera VC1 in the horizontally placed manner, as well as a schematic diagram of the photographic subject PS and the background BG seen from the above, and a vertical axis indicates distances to the photographic subject PS and the background BG and a horizontal axis indicates horizontal lengths in the case where an optical axis of the main camera MC is regarded as an original point, and a horizontal angle of view in the case of photographing by means of the main camera MC and the sub-camera SC.

In FIG. 38, zoom photographing is considered as being equivalent to changing a position of the stereo camera VC1 and performing photographing, and there are schematically shown examples of variously changing the position of the stereo camera VC1 with respect to the photographic subject PS.

The distance from the object as the photographic subject PS becomes shorter with increase in zoom magnification, and in view of the distance becoming shorter, that is, the parallax value becoming larger, an image with the base-line length changed in accordance with the zoom magnification is created for generation of stereo view images, thereby allowing generation of an image free from incompatibility for the human's sense of sight.

In this case, concerning an amount of change in base-line length, a value previously provided as a table is used in accordance with the zoom magnification.

It is to be noted that, when the base-line length is changed, the photographic subject may be placed out of the angle of view depending on the zoom magnification. In that case, a generated image size may be made larger.

Figure 39:
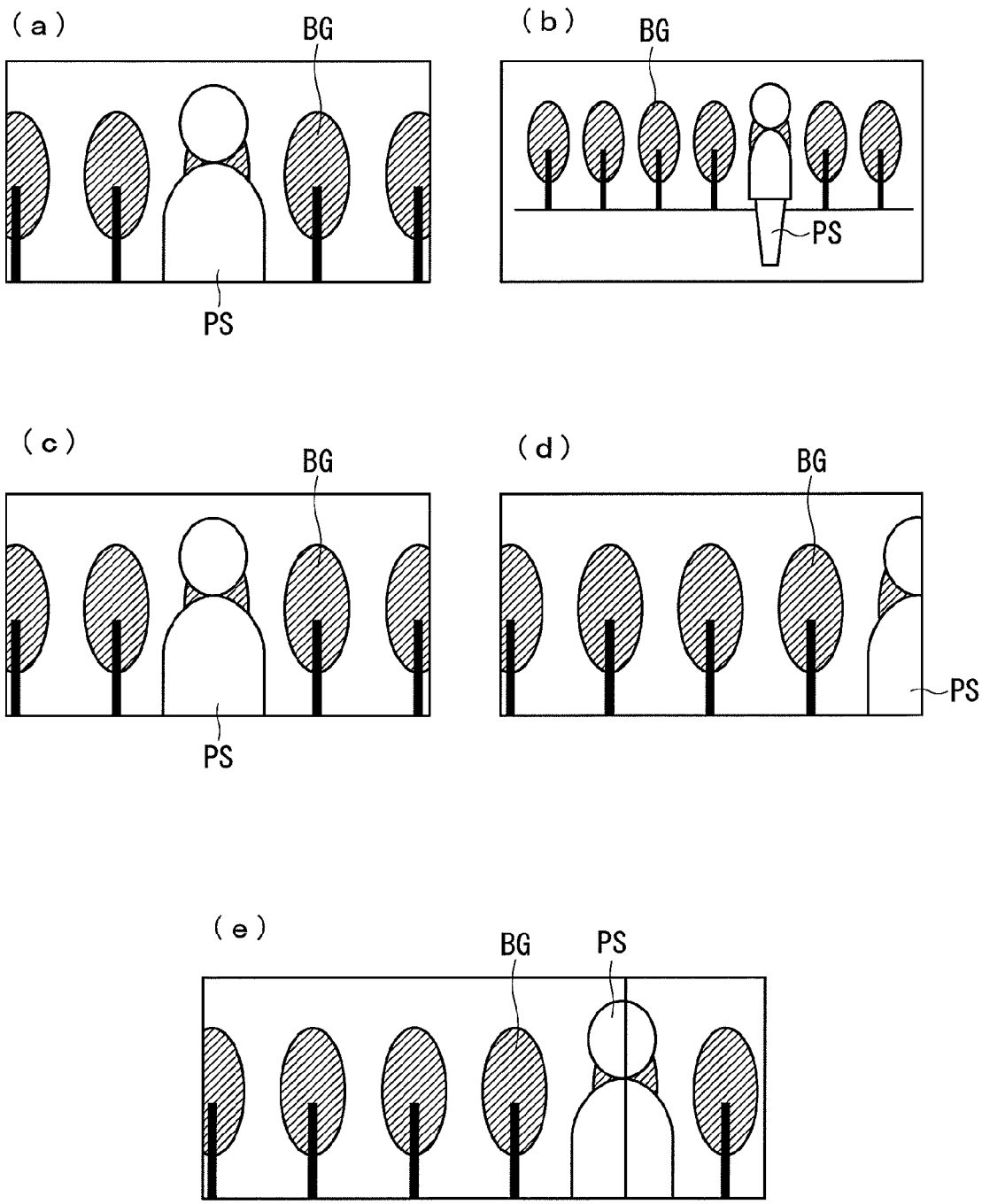

FIG. 39 shows images obtained by the photographed images shown in FIG. 38.

Part (a) of FIG. 39 shows a main camera image photographed by the main camera MC, and part (b) of FIG. 39 shows an image obtained by the sub-camera SC at the time of acquiring the main camera image of part (a) of FIG. 39.

With respect to these images, images part (c) and part (d) of FIG. 39 show images obtained by changing the base-line length.

Part (c) of FIG. 39 shows an image obtained by the main camera MC in the case of not changing the base-line length, and part (d) of FIG. 39 shows the first image obtained by the main camera MC in the case of lengthening the base-line length. As shown in part (d) of FIG. 39, the photographic subject PS may be placed out of the angle of view by lengthening the base-line length, but in that case, as shown in part (e) of FIG. 39, there is performed processing of creating an image of a portion lying off the angle of view in part (d) of FIG. 39 and also enlarging an image size so as to hold the photographic subject PS within the angle of view as shown in part (e) of FIG. 39. It is to be noted that the image of the portion lying off the angle of view may be created based on the image obtained by the main camera MC when the base-line length remains unchanged.

Herein, although the image shown in part (c) of FIG. 39 and the image shown in part (e) of FIG. 39 are used as stereo view images, since the image size of the image of part (e) of FIG. 39 is wide, the right/left images have different image sizes. Thereat, when the image as shown in part (e) of FIG. 39 is created, a certain image is also added to the image shown in part (c) of FIG. 39 so as to increase the image size. Herein, as a method for adding the image, there can be adopted a method for adding an area NR without effective data or a method for copying an image at the end like a mirror.

As described above, in generation of stereo view images, it is possible to make a three-dimensional display free from incompatibility by adopting the first to fourth methods.

It is to be noted that the foregoing first to fourth methods may be singly used or may be used in combination. For example, combining the first method with the fourth method allows a three-dimensional display free from incompatibility.

Modified Example of Embodiments

Although the embodiments according to the present invention described above are performed assuming the use of distance information acquired from the first or second image, stereo view images may be generated without using distance information.

That is, as shown in part (a) of FIG. 40, the stereo camera VC1 may be used in the horizontally placed manner as shown in FIG. 40(a), and stereo view images may be generated using obtained first and second images.

Part (b) and part (c) of FIG. 40 respectively show the first image obtained by the main camera MC and the second image obtained by the sub-camera SC, and part (d) of FIG. 40 shows a new second image with a high resolution obtained from both images.

That is, information of the high-resolution first image is provided to the low-resolution second image, to enhance the resolution of the second image, thereby creating a new second image, and the use of the first image and the new second image as stereo view images enables a three-dimensional display.

In addition, for the use as described above, the stereo camera VC1 may have a sensor for sensing a vertically placed state and a horizontally placed state, and it may be configured such that in the case of the horizontally placed state, a circuit connection is changed so as to form a system to generate stereo view images without using distance information. It is to be noted that the above sensor and circuit connection change are controlled by a controller, such as a microcomputer, not shown in FIG. 7.

<Additional Function>

In the stereo camera as described above, when a photographer incorrectly covers the sub-camera SC by his or her hand, the photographer may not notice that since viewing a picture only by means of the main camera MC. In such a case, the camera may have such a function as to compare a picture obtained by the main camera MC and a picture obtained by the sub-camera SC, to detect a similarity of both images and issue an alarm when there is no similarity.

Other than detection of the similarity, detection may be performed simply by a difference in brightness of the image. This is because the picture obtained by the sub-camera SC is dark when the sub-camera SC is hidden by the hand.

Further, when this causes failure of matching between the picture obtained by the main camera MC and the picture obtained by the sub-camera SC, estimation may be performed using the pseudo three-dimensional image technique or interpolation may be performed from previous and subsequent images in a time series.

Although the present invention has been described in detail, the above descriptions are exemplary in all aspects, and the present invention is not limited thereto. It is understood that countless modified examples, not shown, can be assumed without deviating from the range of the present invention.

DESCRIPTION OF REFERENCE SIGNS 1 photographing information acquiring part
2 main image acquiring part
3 distance information acquiring part
4 right/left image generating part
MC main camera
SC sub-camera

The invention claimed is:

1. A stereo camera, comprising:
a first imaging part which photographs a first image;
a second imaging part which has camera parameters different from those of said first imaging part and photographs a second image;
a distance information acquiring part which associates each pixel in said first and second images and acquires distance information including parallax information, wherein said distance information acquiring part decides a correspondence detection area based on photographing information at the time of photographing said first and second images, and
a right/left image generating part which generates a stereo view image based on one of said first and second images and said distance information, wherein said first imaging part has a higher resolution than said second imaging part, and said right/left image generating part regards said first image as a main image, displaces an image in said correspondence detection area inside said second image in accordance with said parallax information, and regards said first image and said new second image as said right/left images.

2. The stereo camera according to claim 1, wherein, when a number of pixels inside said correspondence detection area of said second image is smaller than a number of pixels inside a correspondence detection area of said first image, said right/left image generating part compensates pixel information from said first image.

3. A stereo camera, comprising:
a first imaging part which photographs a first image;
a second imaging part which has camera parameters different from those of said first imaging part and photographs a second image;
a distance information acquiring part which associates each pixel in said first and second images and acquires distance information including parallax information, wherein said distance information acquiring part decides a correspondence detection area based on photographing information at the time of photographing said first and second images, and
a right/left image generating part which generates a stereo view image based on one of said first and second images and said distance information, wherein said first imaging part has a higher resolution than said second imaging part, and when said second image has a higher photographing magnification than said first image, said right/left image generating part embeds said second image into said first image to generate a new second image, and regards said first image and said new second image as said right/left images.

4. A stereo camera, comprising:
a first imaging part which photographs a first image;
a second imaging part which has camera parameters different from those of said first imaging part and photographs a second image;
a distance information acquiring part which associates each pixel in said first and second images and acquires distance information including parallax information, wherein said distance information acquiring part decides a correspondence detection area based on photographing information at the time of photographing said first and second images, and
a right/left image generating part which generates a stereo view image based on one of said first and second images and said distance information, wherein said first imaging part has a higher resolution than said second imaging part, and when said first image has a higher photographing magnification than said second image, said right/left image generating part embeds said first image into said second image to generate a new first image, and regards said new first image and said second image as said right/left images.

5. A stereo camera, comprising:
a first imaging part which photographs a first image;
a second imaging part which has camera parameters different from those of said first imaging part and photographs a second image;
a distance information acquiring part which associates each pixel in said first and second images and acquires distance information including parallax information; and
a right/left image generating part which generates a stereo view image based on one of said first and second images and said distance information,
wherein said first imaging part has a higher resolution than said second imaging part, said stereo camera further comprises a sensor which senses arrangement of said stereo camera with said first and second imaging parts arrayed in a horizontally placed manner in parallel with a horizontal plane, and stops an operation of said distance information acquiring part in the case of sensing horizontal placement, and said right/left image generating part provides information of said first image to said second image to create a new second image, and regards said first image and said new second image as said right/left images.

* * * * *